us010366168B2

(12) United States Patent
Wu

(10) Patent No.: US 10,366,168 B2
(45) Date of Patent: Jul. 30, 2019

(54) SYSTEMS AND METHODS FOR A MULTIPLE TOPIC CHAT BOT

(71) Applicant: Microsoft Technology Licensing, LLC, Redmond, WA (US)

(72) Inventor: Xianchao Wu, Tokyo (JP)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 15/404,932

(22) Filed: Jan. 12, 2017

(65) Prior Publication Data
US 2018/0196796 A1    Jul. 12, 2018

(51) Int. Cl.
G06F 17/27      (2006.01)
H04L 12/58      (2006.01)
G06F 17/24      (2006.01)
G06N 99/00      (2019.01)
G06N 7/00       (2006.01)
G06N 3/00       (2006.01)
G06F 17/30      (2006.01)
G06N 20/00      (2019.01)
G06F 16/901     (2019.01)
G06F 16/2452    (2019.01)
G06F 17/28      (2006.01)

(52) U.S. Cl.
CPC ...... *G06F 17/279* (2013.01); *G06F 16/24522* (2019.01); *G06F 16/9024* (2019.01); *G06F 17/2775* (2013.01); *G06F 17/2785* (2013.01); *G06F 17/2881* (2013.01); *G06N 3/006* (2013.01); *G06N 7/005* (2013.01); *G06N 20/00* (2019.01); *H04L 51/02* (2013.01)

(58) Field of Classification Search
CPC ....... G06G 3/14; G06G 17/2785; G10L 15/22
See application file for complete search history.

(56) References Cited

U.S. PATENT DOCUMENTS

| 9,369,410 B2 | 6/2016 | Capper et al. |
| 2005/0192959 A1* | 9/2005 | Miyata ................ G06F 16/285 |
| 2007/0294229 A1 | 12/2007 | Au |
| 2008/0189367 A1 | 8/2008 | Okumura |
| 2014/0122083 A1 | 5/2014 | Xiaojiang |
| 2015/0127526 A1 | 5/2015 | Ye et al. |
| 2015/0142704 A1* | 5/2015 | London ............ G06F 16/90332 706/11 |

(Continued)

OTHER PUBLICATIONS

Uthus et al., "Multi participant chat analysis: A survey", In Journal of Artificial Intelligence, Feb. 26, 2013, pp. 106-121.

(Continued)

*Primary Examiner* — Pierre Louis Desir
*Assistant Examiner* — Yi Sheng Wang
(74) *Attorney, Agent, or Firm* — Merchant & Gould

(57) ABSTRACT

Systems and methods for multiple topic automated chatting are provided. The systems and method provide multiple topic automated (or artificial intelligence) chatting by analyzing user inputs in a conversation to determine a plurality topics, to determine and score features related to the determined topics and different users, and to create a knowledge graph of the determined topics. Based on these determinations, the systems and methods may determine if a reply should be provided and then predict a reply.

20 Claims, 14 Drawing Sheets

(56) References Cited

U.S. PATENT DOCUMENTS

2015/0286709 A1* 10/2015 Sathish .................. G06N 7/005
                                                            706/52
2016/0080485 A1*  3/2016 Hamedi ............ G06F 16/24578
                                                           709/204
2016/0094492 A1   3/2016 Li et al.

OTHER PUBLICATIONS

Bengel, et al., "ChatTrack: Chat Room Topic Detection Using Classification", In Proceedings of Intelligence and Security Informatics, Second Symposium on Intelligence and Security Informatics, Jun. 10, 2004, 10 pages.

Roth, Ben, "Topic Extraction and Relation in Instant Messaging", In Technical Report of CS224N, Jun. 10, 2010, 10 pages.

Adams, et al., "Topic Detection and Extraction in Chat", In Proceedings of the IEEE International Conference on Semantic, Aug. 4 2008, pp. 581-588.

Gainaru, et al., "Toolkit for automatic analysis of chat conversations", In Proceedings of 8th International Conference on Communications, Jun. 10, 2010, pp. 99-102.

* cited by examiner

SYSTEMS AND METHODS FOR A MULTIPLE TOPIC CHAT BOT

BACKGROUND

Bots are becoming more and more prevalent and are being utilized for more and more different tasks. As understood by those skilled in the art, bots are software applications that may run automated tasks over a network, such as the Internet. Chat bots are designed to conduct a conversation with a user via text, auditory, and/or visual methods to simulate human conversation. A chat bot may utilize sophisticated natural language processing systems or scan for keywords from a user input and then pull a reply with the most matching keywords or the most similar wording pattern from a database. However, chat bots are often limited to simple task driven conversations.

It is with respect to these and other general considerations that aspects disclosed herein have been made. Also, although relatively specific problems may be discussed, it should be understood that the aspects should not be limited to solving the specific problems identified in the background or elsewhere in this disclosure.

SUMMARY

In summary, the disclosure generally relates to systems and methods for multiple topic automated chatting. The systems and methods as described herein provide artificial intelligence chatting with multiple topics by analyzing user inputs in a conversation to determine a plurality topics, to determine and score features related to the determined topics and different users, and to create a knowledge graph of the determined topics. Based on these determinations, the systems and methods may determine if a reply should be provided and then predict a reply to provide.

As such, the systems and methods as described herein perform multiple topic intelligent automated chatting that is more effective, more engaging, easier to use, and more lifelike than previously utilized chat bots that were not able to track and respond to multiple topics in a conversation between one or more users.

One aspect of the disclosure is directed to a system for a multiple topic chat bot. The system includes at least one processor and a memory. The memory encodes computer executable instruction that, when executed by the at least one processor, are operative to:
  collect user inputs in a conversation to form a collection;
  analyze the collection to determine topics in the conversation;
  assign an emotion label to each topic;
  identify a relationship between different users;
  score a closeness of the relationship based on social connection, agreement, and sentiment analysis to form a scored first feature;
  score each user's interest in each topic based on user sentiment toward each topic and engagement frequency in each topic to form a scored second feature;
  score an engagement rate for each topic of the topics based on a number of users engaged in a topic, frequency of the topic in the conversation, timing of the topic, and the user sentiment toward the topic to form a scored third feature;
  create a knowledge graph of the topics that graphs relationships between the topics utilizing topic keywords based on the collection and world knowledge;
  determine that a first topic meets a relevancy threshold based on scored features for the first topic;
  predict one or more first responses based on the knowledge graph and the user inputs associated with the first topic; and
  provide the one or more first responses to the conversation.

The scored features include the scored first feature, the scored second feature, and the scored third feature for the first topic.

In another aspect, a method for automated multi-topic chatting is disclosed. The method includes:
  collecting inputs in a conversation to form a collection;
  analyzing the collection to determine topics in the conversation;
  assign a sentiment to each topic;
  scoring an engagement rate for each topic to form an engagement score for each topic;
  scoring a user interest in each topic to form an interest score for each topic;
  creating a knowledge graph between the topics that graphs relationships between the topics;
  determining that a first topic of the topics meets a relevancy threshold based on the engagement score and the interest score of the first topic;
  predicting a first response utilizing the knowledge graph and inputs associated with the first topic; and
  providing the first response to the conversation.

In yet another aspect of the invention, the disclosure is directed to a system for a multiple topic intelligent chat bot. The system includes at least one processor and a memory. The memory encodes computer executable instruction that, when executed by the at least one processor, are operative to:
  collect user inputs from a group chat of a first user and a second user to form a collection;
  analyze the collection to determine a first topic and a second topic;
  assign a sentiment to each of the first topic, the second topic, and the third topic;
  create a knowledge graph of the first topic and the second topic;
  identify a first relationship between the first user and the second user;
  score a closeness of the first relationship to form a scored first relationship;
  score an interest of each of the first user and the second user in the first topic to form a scored first user-first topic interest and a scored second user-first topic interest;
  score the interest of each of the first user and the second user in the second topic to form a scored first user-second topic interest and a scored second user-second topic interest;
  score an engagement rate for each of the first topic and the second topic to form a scored first topic engagement rate and a scored second topic engagement rate;
  determine a first relevancy score of the first topic based on a first evaluation of:
    the scored first relationship if both the first user and the second user discussed the first topic with each other;
    the scored first user-first topic interest,
    the scored second user-first topic interest, and
    the scored first topic engagement rate;
  determine a second relevancy score of the second topic based on a second evaluation of:

the scored first relationship if both the first user and the second user discussed the second topic with each other;
the scored first user-second topic interest,
the scored second user-second topic interest, and
the scored second topic engagement rate;
determine that a second topic meets a relevancy threshold based on the second relevancy score of the second topic;
predict a response utilizing the knowledge graph and the user inputs associated with the second topic; and
provide the response to the group chat.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive embodiments are described with reference to the following Figures.

DETAILED DESCRIPTION

Figure 1A:
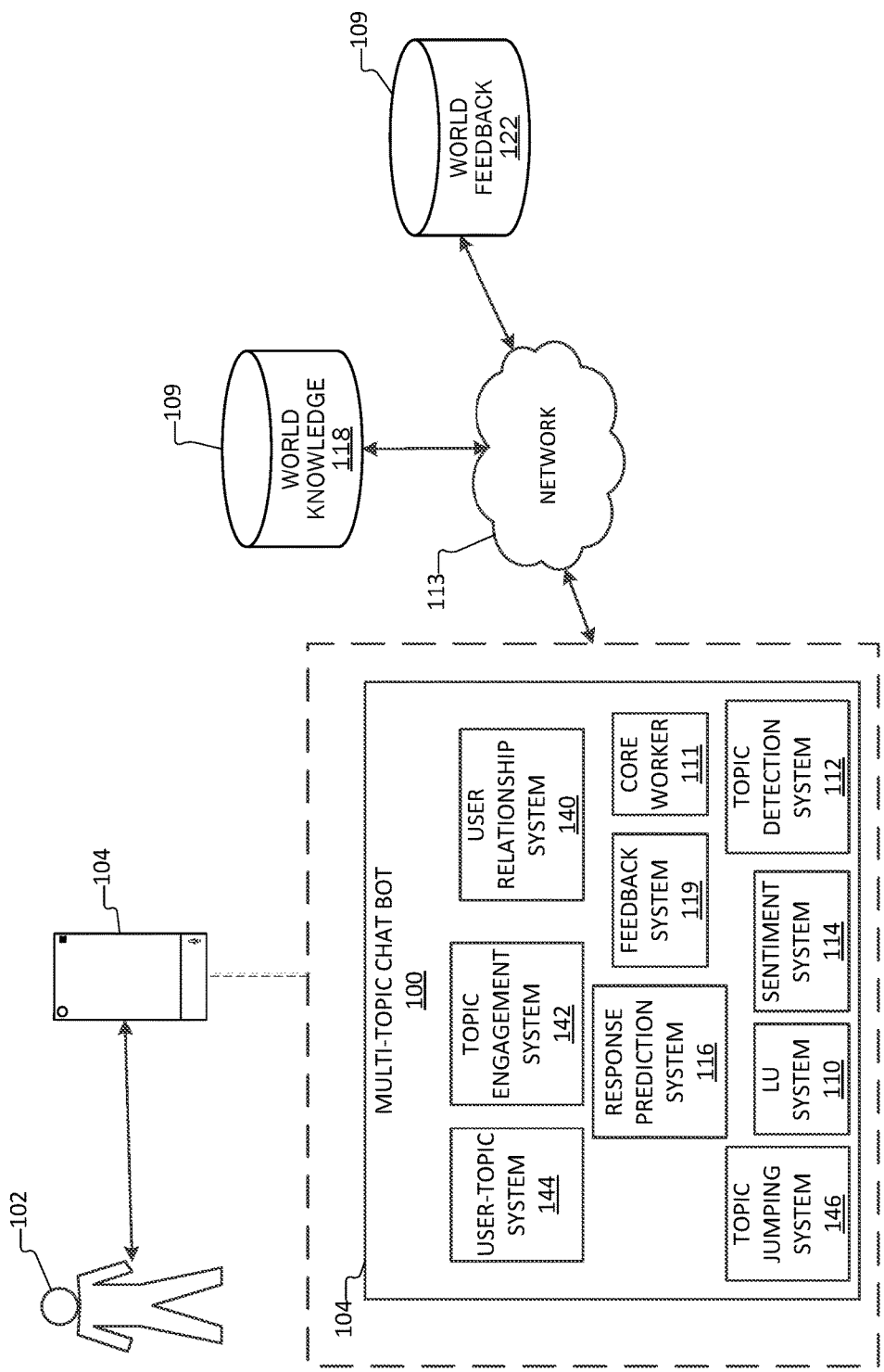
FIG. 1A is a schematic diagram illustrating a multiple topic artificial intelligence (AI) chat bot on a client computing device being utilized by a user, in accordance with aspects of the disclosure.

In the following detailed description, references are made to the accompanying drawings that form a part hereof, and in which are shown by way of illustrations specific aspects or examples. These aspects may be combined, other aspects may be utilized, and structural changes may be made without departing from the spirit or scope of the present disclosure. The following detailed description is therefore not to be taken in a limiting sense, and the scope of the present disclosure is defined by the claims and their equivalents.

Bots are becoming more and more prevalent and are being utilized for more and more different tasks. As understood by those skilled in the art, bots are software applications that may run automated tasks over a network, such as the Internet. Chat bots are designed to conduct a conversation with a user via auditory or visual methods to simulate human conversation. A chat bot may utilize sophisticated natural language processing systems or scan for keywords from a user input and then pull a reply with the most matching keywords or the most similar wording pattern from a database. Chat bots are often utilized for customer service or information acquisition. However, chat bots are often limited to simple task driven conversations.

For example, e-commerce online shopping customizes the general chat bots to fit individual shops (for clothes, shoes, cameras, cosmetics and so on) and supply online and in-time conversation-style consumer services. Through this multiple round conversation, the consumers' questions are answered and the consumers' orders will be consequently received. In addition, consumers' detailed requests are clarified step-by-step during the session of a conversation. However, these types of consumer service chat bots are typically designed to be single-round question-answering service. Further, the user can often tell that they are conversing with a chat bot due to the lack of emotion and limited task oriented questions. As such, the currently utilized chat bots are unable to follow and respond to multiple topics in a conversation with one or multiple users.

As such, the systems and method as disclosed herein are directed to a multiple topic artificial intelligence (AI) chat bot that can respond to user queries and spontaneously respond (without a response request) in a conversation with multiple topics with one or more users. The multiple topic AI chat bot utilizes deep learning and sentiment analysis to identify topics, determine and score relationships between users, determine and score topic engagement, and to determine and score user-topic interest. Further, the multiple topic AI chat bot creates a knowledge graph of the relationships between the different determined topics. The multiple topic AI chat bot determines if a response should be provided by the chat bot by evaluating the determined determined and scored relationships between users, the determined and scored topic engagement, and the determined and scored user-topic interest for each identified topic. If the multiple topic chat bot 100 determines to provide a response, the multiple topic AI chat bot predicts a response based at least on the created knowledge graph. In some aspects, the multiple topic AI chat bot utilizes user feedback and/or world feedback to train and update the learning algorithms and/or models of the AI chat bot to improve the multiple topic AI chat bot's responses over time.

The ability of the systems and methods to perform multiple topic intelligent automated chatting as described herein provides a chat bot or application that is capable of tracking multiple topics in a conversation with one or more users and providing contextually and emotionally appropriate spontaneous responses or requested responses. Further, the ability of the systems and methods described herein to select contextually and emotionally appropriate responses for multiple topic conversations improves the user's trust and engagement with chat bot. As such, the systems and methods that perform multiple topic automated chatting as described herein provide a chat bot that is more effective, more engaging, easier to use, and more lifelike than previously utilized chat bots that were not able to track and respond to multiple topic conversations between one or more users.

Figure 1B:
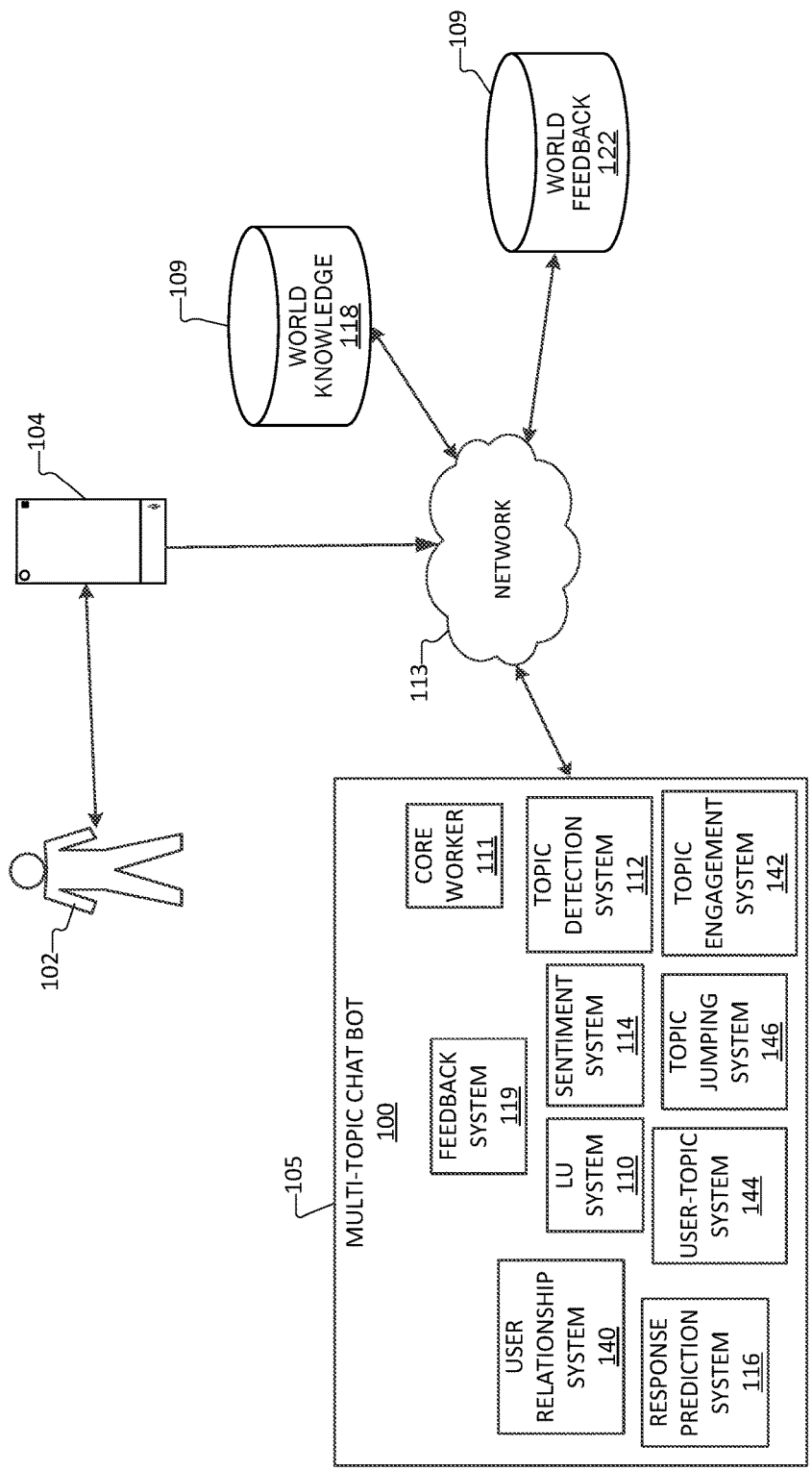
FIG. 1B is a schematic diagram illustrating a multiple topic AI chat bot on a server computing device being utilized by a user via a client computing device, in accordance with aspects of the disclosure.

FIGS. 1A and 1B illustrate different examples of a multiple topic chat bot 100 or multiple topic AI chat bot 100 being utilized by a user, in accordance with aspects of the disclosure. The chat bot 100 is capable of determining, tracking, and spontaneously or upon request responding in a conversation with multiple topics with one or more users.

The chat bot 100 includes a language understanding (LU) system 110, a topic detection system 112, a sentiment system 114, a response prediction system 116, a feedback system 119, a core worker 111, a user relationship system 140, a topic engagement system 142, a user-topic system 144, and a topic jumping system 146. The chat bot 100 may also communicate with other databases 109 and servers 105 via network 113, such as database that tracks and stores world feedback 122. In some aspects, the network 113 is a distributed computing network, such as the internet. In some aspects, the chat bot 100 communicates with and/or retrieves or accesses data from world knowledge 118 via a network 113.

In some aspects, the chat bot 100 is implemented on the client computing device 104 as illustrated by FIG. 1A. In a basic configuration, the client computing device 104 is a computer having both input elements and output elements. The client computing device 104 may be any suitable computing device for implementing the chat bot 100. For example, the client computing device 104 may be a mobile telephone, a smart phone, a tablet, a phablet, a smart watch, a wearable computer, a personal computer, a gaming system, a desktop computer, a laptop computer, and/or etc. This list is exemplary only and should not be considered as limiting. Any suitable client computing device 104 for implementing the chat bot 100 and/or for communicating with the chat bot 100 may be utilized.

In other aspects, the chat bot 100 is implemented on a server computing device 105, as illustrated in FIG. 1B. The server computing device 105 may provide data to and/or receive data from the client computing device 104 through the network 113. In further aspects, that chat bot 100 is implemented on more than one server computing device 105, such as a plurality or network of server computing devices 105. For example, the LU system 110 may be located on server separate from a server containing the core worker 111. In some aspects, the chat bot 100 is a hybrid system with portions of the chat bot 100 on the client computing device 104 and with portions of the chat bot 100 on one or more server computing devices 105.

Figure 2A:
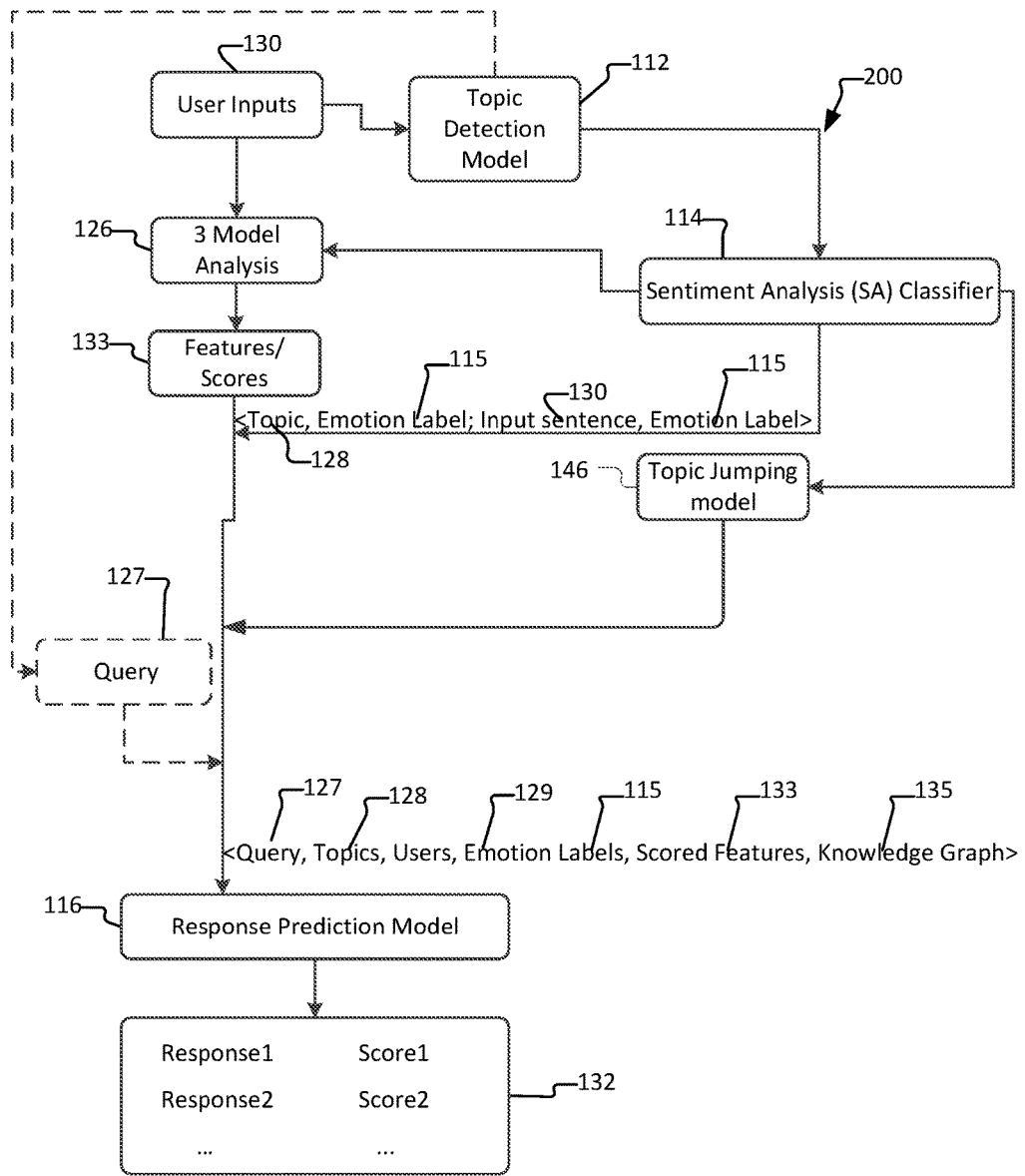
FIG. 2A is a schematic diagram illustrating a work flow for a multiple topic AI chat bot, in accordance with aspects of the disclosure.
Figure 2B:
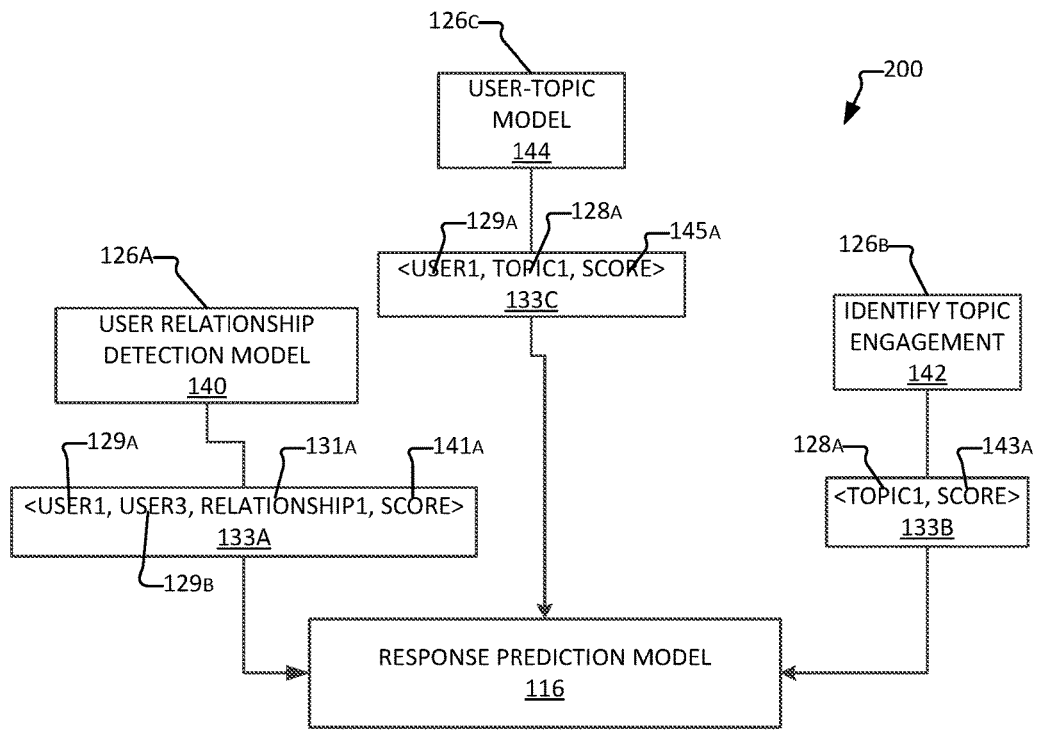
FIG. 2B is a schematic diagram illustrating operations 126, 133, and 116 for the work flow for the emotionally intelligent AI chat bot shown in FIG. 2A, in accordance with aspects of the disclosure.

FIG. 2A illustrates a work flow diagram 200 for a multiple topic AI chat bot 100, in accordance with aspects of the disclosure. FIG. 2B illustrates systems/operations 126, 133, and 116 for the work flow diagram 200 for the multiple topic AI chat bot 100 shown in FIG. 2A, in accordance with aspects of the disclosure. The chat bot 100 collects user inputs 130 for a conversation. The conversation may between the chat bot 100 and one user as illustrated in FIG. 3B or between the chat bot 100 and a plurality of users as illustrated in FIG. 3B. As such, the user inputs 130 may be from one or more users 102 of the chat bot 100 engaged in a conversation with each other and the chat bot 100. The user inputs 130 may include one or more queries for the chat bot 100. A conversation as utilized herein refers to electronic communication between the one or more users and the AI chat bot, which may be hosted by a site, a location, an application, the chat bot 100, and/or computing device. Further, the topics of the conversation may be open domain oriented. That is, any domain in ordinary lives may be involved in the conversation.

In some aspects, the multiple topic AI chat bot 100 utilizes learning algorithms and/or models and sentiment analysis 114 to identify topics 128 utilizing a topic detection system 112, determine and score relationships 131 between users 102 utilizing a user relationship detection system 140, determine and score topic engagement utilizing a topic engagement system 142, and to determine and score user-topic interest utilizing a user-topic system 144. Further, the multiple topic AI chat bot 100 creates a topic knowledge graph 135 of the relationships between the different determined topics 128 utilizing a topic jumping system 146. The multiple topic AI chat bot 100 determines if a spontaneous or requested response should be provided by the AI chat bot 100 based on the scored relationships, scored topic engagement, and/or the scored user-topic interest utilizing a response prediction system 116. When the AI chat bot 100 decides to provide a response, the response prediction system 116 predicts a response utilizing collected inputs, labeled sentences, labeled topics, scored features, and/or the created knowledge graph 135.

The one or more users 102 enter input 130 into the user interfaces' of their client computing devices to participate in the conversation. The input is collected by the AI chat bot 100 and saved and provided (such as displayed) to the forum hosting the conversation. The user interface of the client computing devices 104 of each user 102 in the conversation may provide (such as display) all of the inputs for the conversation to their user. A user input 130 as utilized herein refers to a user question, a user query 127, a user comment, a user answer, or any other user information input and intended for the conversation with the chat bot 100 and/or other users 102 in the conversation. A user query 127 as utilized herein refers to any question or request for the chat bot 100 from one or more users that requires or is intended to illicit a response or action by the chat bot 100. Each user 102 may provide his or her input 130 as text, video, audio, and/or any other known method for gathering user input. In the user's input area, a user 102 can type text, select emoji symbols, and make a short-cut of current screen. Additionally, the user 102 can make a voice call or a video conversation with the chat bot 100 and/or other users 102. For example, the user interface of the client computing device 104 may receive the user's input 130 as voice input.

The chat bot 100 collects the user input 130 from the client computing device 104. The term "collect" as utilized herein refers to the passive receiving or receipt of data and/or to the active gathering or retrieval of data. The core worker 111 of the chat bot 100 collects the user input 130.

Figure 3A:
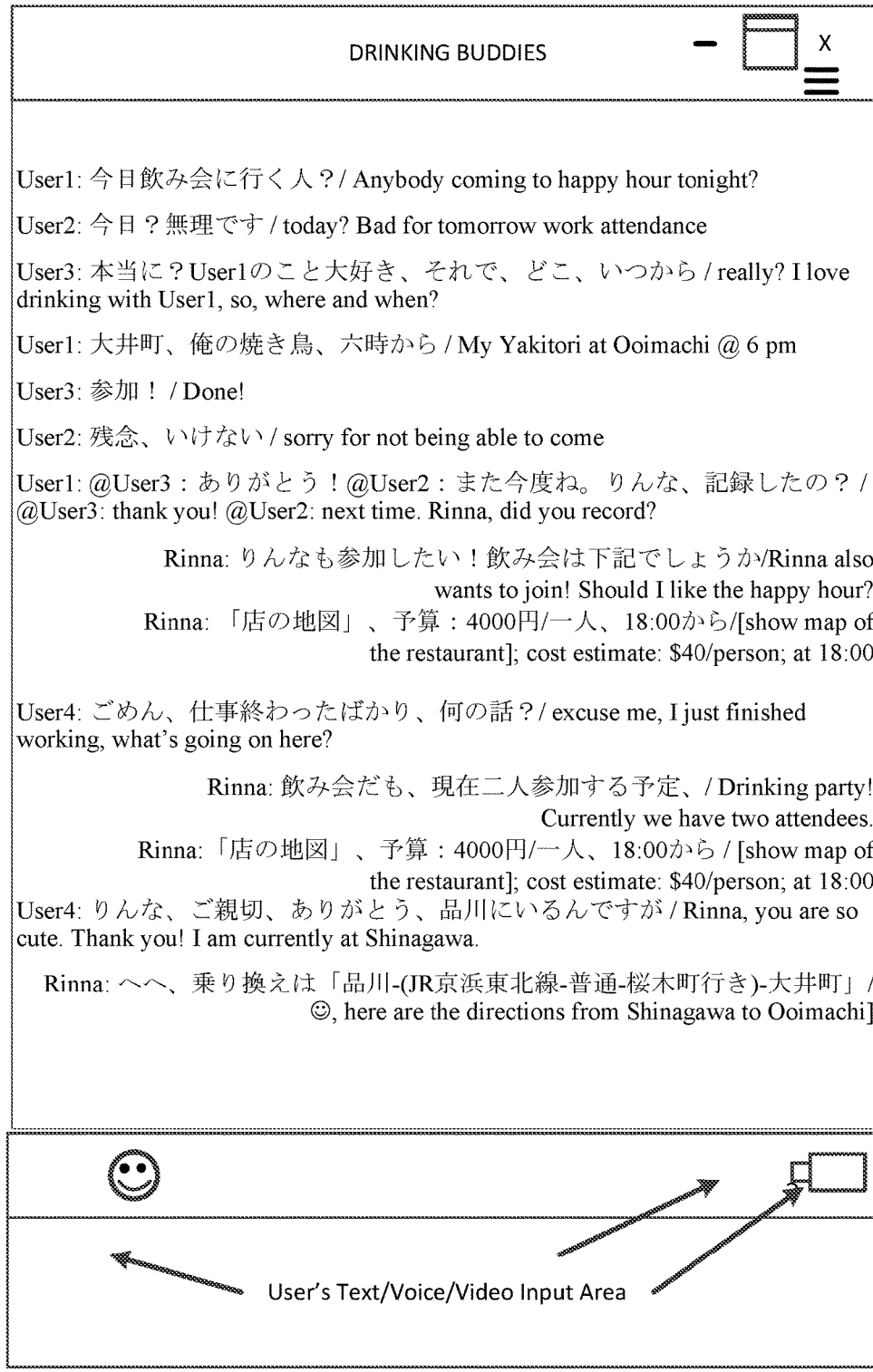
FIG. 3A is a schematic diagram illustrating a screen shot of a user interface of the user's client computing device during a conversation with a multiple topic AI chat bot system with multiple users, in accordance with aspects of the disclosure.
Figure 3B:
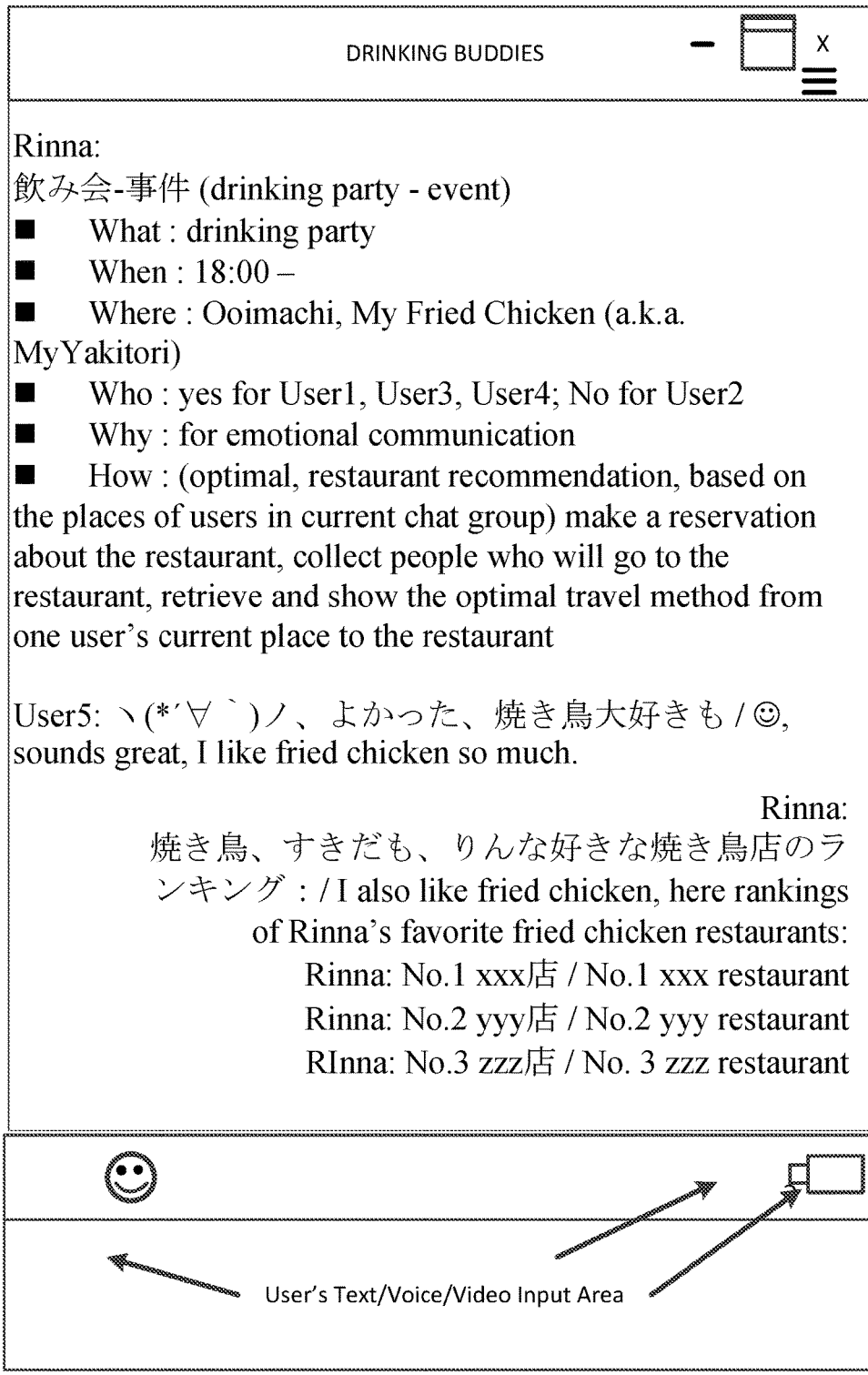
FIG. 3B is a schematic diagram illustrating a screen shot of a user interface of the user's client computing device shown in FIG. 3A during a conversation with the multiple topic AI chat bot during a conversation with a single user, in accordance with aspects of the disclosure.

For example, in the group conversation between User 1, User 2, User 3, User 4, and the chat bot 100 as shown in the user interface (UI) illustrated in FIG. 3A, the chat bot 100 collects the user input 130 from User 1: "Anybody coming to happy hour tonight?"; "At Ooimachi @ 6 pm"; "@User3: thank you! @User2: next time. Rinna did you record?". In FIGS. 3A-3B, Rinna stands for the name of the AI chat bot 100. The chat bot 100 also collects the user input 130 from User 2: "Bad for tomorrow work attendance" and "sorry for not being able to come"; from User 3: really? I love drinking with User1, so, where and when?" and "Done!"; and from User 4: "Excuse me, I just finished working, what's going on here?" and "Rinna, you are so cute. Thank you! I am currently at Shinagawa." Each of the above sentences are transferred to the "request queue", which stores users' requests in multimedia format including texts, sounds, images, and even videos by the core worker 111 of the chat bot 100. However, the chat bot 100 deals with different kinds of multimedia inputs differently. For example, for real-time sounds and videos, the AI chat both 100 needs a sufficient amount of core workers 111 to ensure that the queue is not too long so a user utilizing the chat bot 100 does not receive too long of a delay between his or her input 130 and the AI chat bot 100 reply 132. For texts and images, the chat bot 100 may utilize less core workers 111 for processing.

The core worker 111 collects the request queue as input. Requests in the queue are served and/or responded to in first-in-first-out manner by the core worker 111. As such, the core worker 111 will one-by-one determine a type of input (voice, video, text, etc.) of each input 130 for proper processing by the chat bot 100. For example, the core worker 111 will send the user inputs 130 to the topic detection system 112, the sentiment system 114, the response prediction system 116, user relationship system 140, topic engagement system 142, user-topic system 144, topic jumping system 146 and/or the feedback system 119.

The core worker 111 utilizes or sends the user's input 130 to a language understanding (LU) system 110 for processing. The LU system 110 converts the user's inputs 130 into text and/or annotated text. The LU system 110 includes application programming interfaces (APIs) for text understanding, speech recognition, and/or image/video recognition for processing user inputs 130 into text and/or annotated text form.

Sounds need to be recognized and decoded as texts. A speech recognition API may be necessary for the speech-to-text conversion task and is part of the LU system 110. Furthermore, the LU system 110 may need to convert a generated response 132 from text to voice to provide a voice response to the user 102. Further, the LU system 110 may also include an image recognition API to "read" and "understand" received images from the user 102. The image recognition API of the LU system 110 translates or decodes received images into text. Further, a response 132 by the chat bot 100 may be translated into images by the LU system 110 to provide an image response to the user 102. For example, if the selected response is good job, the LU system 110 could convert this text into a thumbs-up, which is displayed to the user as an image or emoticon. The core worker framework allows APIs to be easily added or removed. As such, the core worker framework is extensible.

For example, the core worker 111 utilizing the LU system 110 provides Rinna's (or chat bot's 100) responses of: "Rinna also want to join! Should I like the drinking party?"; "[show map of the restaurant]; cost estimate: $40/person; at 18:00"; "Drinking party! Currently we have two attendees."; "[show map of the restaurant]; cost estimate: $40/person; at 18:00."; and "[☺]", here are the directions from Shinagawa to Ooimachi" that include text, emoji's and maps as illustrated by FIG. 3A.

The responses selected by the response prediction system 116 of the chat bot 100 are provided to the core worker 111. The core worker 111 transfers the response to the response queue or into a cache. The cache is necessary to make sure that a sequence of AI chat bot responses 132 or replies 132 can be shown to the user in a pre-defined time stream. That is, for one user's input, if there are no less than two responses generated by the core worker 111, then a time-delay setting for the responses may be necessary.

For example, if the user says, "Rinna, did you eat your breakfast?", the multiple topic AI chat bot 100 may generate two responses, such as "yes, I ate bread," and "How about you? Still felling hungry?". In this scenario the core worker 111 ensures that the first response is provided to the user immediately. Also, the core worker 111 of the chat bot 100 may ensure that the second response is provided in a time delay, such as 1 or 2 seconds, so that the second message will be provided to the user two seconds after the first message. As such, the cache of the core worker 111 manages these to-be-sent response messages together with user identities and appropriate timing for each chat bot generated question or comment.

The text or annotated text generated by the LU system 110 for each collected input in the conversation is collected by the topic detection system 112 of the chat bot 100. The one or more inputs in a conversation between the chat bot 100 and/or one or more users may be referred to herein as a collection. The topic detection model 112 analyzes the user inputs 130 or collection to determine one or more topics 128 in the conversation between the chat bot 100 and one or more users 102. The topic detection system 112 may utilize a syntactic dependency parser to parse sentences in session and pick noun words/phrases that are topic candidates. An existing topic database can be obtained in a similar way by dependency parsing the web-sites and/or chatbot's large-scale chat logs in chat sessions. For example, for the sentence "今日飲み会に行く人?/Anybody coming to happy hour tonight?" as illustrated in FIG. 3A, the different topics that may be identified by a semantic dependency tree of the topic detection system 112 are listed below:

今日-D/Tonight
飲み会に-D/drinking party/happy hour
行く-D/coming
人?/anyone

Figure 9:
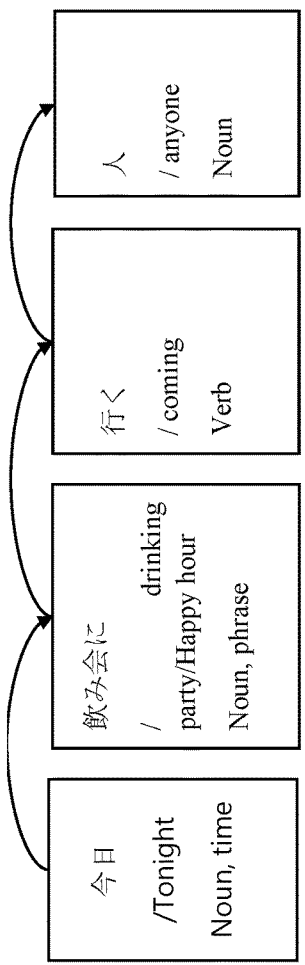
FIG. 9 is a schematic diagram illustrating an example of the syntactic dependency tree created by a topic detection system for an example sentence of "Anybody coming to happy hour tonight?", in accordance with aspects of the disclosure.

Further, FIG. 9 illustrates an example of the syntactic dependency tree for the example sentence discussed above. Part-of-speech (POS) tags are also labeled to each word in the tree. Accordingly, the candidate nouns for the example sentence above include "happy hour" and "anyone". Since "anyone" is closer to a pronoun, "happy hour" is selected as the topic keyword by the topic detection system 112 for the example sentence provided above. Further, the topic detection system 112 may identify that an input is a query and that the query input is associated with one or more topics. In response to identifying the query 127, the response prediction system 116 may collect the query 127 and associated one or more topics from the topic detection system 112. As such, topic detection system 112 may associate every sentence with one or more topic or topic keywords.

The topic detection system 112 stores each determined topic. In some aspects, the topic detection system 112 compares the timing of each determined topic to a timing threshold. In these aspects, if the timing of the determined topic does not meet a timing threshold, the topic detection system 112 deletes the topic from topic detection system 112 and the chat bot 100. If the timing of the determined topic meets the timing threshold, the determined topic is continued to be stored by the topic detection system 112 and the chat bot 100. The timing of a topic refers to how recently the topic was last discussed in a conversation. If a determined topic has not been discussed by any user in the conversation for 23 hour, the timing of this topic is 23 hours. In some aspects, the timing threshold is 1 week, 3 days, 1 day, 12 hours, 6 hours, 5 hours, 1 hour, 30 minutes, 20 minutes, 10 minutes, or 5 minutes. However, these timing thresholds are exemplary and are not meant to be limiting. Any suitable timing threshold may be utilized by the topic detection system 112 as would be understood by a person of skill in the art.

The sentiment system 114, also referred to herein as the sentiment analysis system or sentiment analysis classifier, collects user input 130 and the topics 128 from topic detection system 112. In some aspects, the sentiment system 114 of the chat bot 100 collects the user input 130 from the client computing devices 104. In other aspects, the sentiment system 114 collects the user input 130 from the topic detection system 112.

The sentiment system 114 analyzes the input sentences associated with each topic 128 to determine an emotion for each topic 128. In some aspects, the sentiment system 114 determines if the emotion of a topic 128 is positive or negative. In other aspects, the sentiment system 114 determines if the emotion for a topic 128 is positive, negative, or neutral. The sentiment system 114 may outputs an emotion label 115 for each topic 128 that is representative of the emotions of the users 102 for that topic based on the sentiment assigned to the sentences of the users that related to that topic. Accordingly, the sentiment system 114 also assigns an emotion label that represents the emotion of a user for each input sentence of a user in a conversation. The emotion label 115 may be assigned utilizing a simple heuristic rule so that a positive emotion for topic 128 receives a score or emotion label of 2, a neutral emotion for a topic 128 receives a score or label or 1, and a negative emotional label for a topic 128 receives an emotion label or score of −1. As such, the emotion labels for each input sentence associated with a topic may be averaged to determine an appropriate emotion label for a given topic. A topic 128 with an assigned emotion label 115 may be referred to herein as a labeled context sentence. An input sentence with an assigned emotion label is referred to herein as a labeled sentence. The sentiment system 114 identifies an emotion label 115 by utilizing one or more the following features:
 Word ngrams: unigrams and bigrams for words in the text input;
 Character ngrams: for each word in the text, character ngrams are extracted, for example, 4-grams and 5-grams may be utilized;
 Word skip-grams: for all the trigrams and 4-grams in the text, one of the words is replaced by * to indicate the presence of non-contiguous words;
 Brown cluster ngrams: brown clusters are utilized to represent words (in text), and extract unigrams and bigrams as features;
 Part-of-speech (POS) tags: the presence or absence of part-of-speech tags are used as binary features;
 Lexicons: the English wordnet Sentiment Lexicon may be utilized;
 Social network related words: number (in text) of hashtags, emoticons, elongated words, and punctuations are may also be utilized; and
 Word2vec cluster ngrams: Word2vec tool may be utilized to learn 100-dimensional word embedding from a social network dataset, next a K-means algorithm and L2 distance of word vectors is employed to cluster the million-level vocabulary into 200 classes that represent generalized words in the text.

A multiple class support vector machine (SVM) model is trained utilizing these features to determine the sentiment of each topic 128. In some aspects, the sentiment system 114 may also utilize sound-based sentiment analysis for any received recorded voice of the applicant to judge how positive the applicant is during a topic 128.

The analysis systems 126 and the topic jumping system 146 collect the labeled topics 128 and/or the labeled sentences associated with one or more topics from the sentiment analysis system 114 as illustrated in FIG. 2A. In some aspects, the response prediction system 116 also collects the labeled topics 128 and/or the labeled sentences associated with one or more topics from the sentiment analysis system 114 as illustrated in FIG. 2A.

The analysis systems 126 include the user relationship system 140, the topic engagement system 142, and/or the user-topic system 144 as illustrated in FIG. 2B. The analysis systems 126 each determine and score a specific feature 133 based on the collected topics 128, collect labeled sentences associated with one or more topics, and/or the topic emotion labels 115. In some aspects, each of the analysis systems 126 (the user relationship system 140, the topic engagement system 142, and/or the user-topic system 144) output a score that utilize the same scale, such as 1-3, 1-5, 1-10, or etc. The use of the same scale for each of the analysis systems 126, allow for easier and/or more efficient comparisons between the different determinations from the different models of systems 140, 142, and 144.

The user relationship system 140 determines the relationship between each set of two different users. However, if only one user and the chat bot 100 are engaged in the conversation this relationship system 140 may be skipped or not performed. In some aspects, the user relationship system 140 utilizes a learning algorithm or model. As illustrated by FIG. 2B, the output of the user relationship system 140 may be an identified relationship 131 between a set of two different users 102 in conversation with the chat bot 100 and a score 141 of the closeness of this relationship 131. For example, as illustrated by FIG. 2B, the user relationship detection model 140 may determine the relationship 131A between User1 129A and User3 129B and a closeness score 141A for the relationship 131A. In some aspects, possible relationships 131 include:
 [Family]: Parents, Sisters, brothers, Lover(s), children, other family relations;
 [Company]: leaders/managers, colleagues, co-workers;
 [Education]: School/college/university: professors, teachers, class-mates;
 [Habits]: Interesting groups: friends; and
 [Services]: serviceman/servicewoman for shopping, traveling, and so on.

It may be relatively difficult to build a machine learning model for the above relationships since the training data is quite sparse and difficult to collect. Accordingly, the relationship detection system 140 builds a heuristic rule based model to determine user relationships 131 by utilizing hint words. For example, if one user tells another use that "our leader gave us a new task", then the relationship between them is more like "colleagues" or "co-workers". If the sentence is "can you help repair that machine? It did not work for a long time", then the relationship is more similar to "consumer—serviceman". Accordingly, the relationship detection system 140 utilizes predetermined hand-made heuristic rules.

Next, the relationship detection system 140 calculates the "closeness" score 141 between a set of two users based on social connection, agreement, and/or sentiment analysis of inputs provided between the two different users. The social connection refers to how close a determined relationship usually is between two people. For example, immediate family may be ranked closer than extended family and friends may be ranked closer than work colleagues. Agreement refers to how often the two different users agree on opinions or topics. For example, the more topics or opinions the two different users agree on, the higher their agreement score. Lastly, the sentiment of the sentences between the two users is analyzed to determine if the user usually exchange more positive or more negative inputs with each other. The more positive the inputs between the users in the conversation, the higher the sentiment score between the two users. The higher the social connection, agreement, and/or sentiment scores between the two users, the higher the closeness score of the relationship between the two different users. The lower the social connection, agreement, and/or sentiment scores between the two users, the lower the closeness score of the relationship between the two different users.

In some aspects, the closeness score 141 of the relationship 131 between the two user is determined utilizing the pre-defined equations of:

$$S(user1, user2) = a1 * \text{accumulated topic engagement rates of shared topics} / (\text{accumulated engagement rates of topics of user1} + \text{accumulated engagement rates of topics of user2}) + a2 * \text{number of @ between them} / \text{number of @ in the group} \quad \text{EQ\#1};$$

where, a1 and a2 are pre-defined weights for these two parts, the first part is a shared topic score and the second is the interaction score by the hint of @ (where the @ symbol is utilized to cite/refer to another user).

When we sum up over different user2, we obtain the popular score of user1, that is:

$$P(user1) = \text{Sum over user2 of } S(user1, user2) = \Sigma_{user\ in\ the\ group} S(user1, user) \quad \text{EQ\#2}.$$

For example, if User1 129A and User3 129B are based on the conversation displayed in FIG. 2B, the determined relationship 131A for User1 129A and User 3 129B may be identified as friends with a high closeness score 141 based on friends being a close relationship, the positive sentiment between the User #1 and User#3 ("I love drinking with User1"), the frequency with which User 1 and User 3 converse (3 interactions), and that both User 1 and User 3 agree that happy hour should be attended.

The topic engagement system 142 determines a score for each topic that represents how often and how recently a topic is discussed or engaged in by the one or more user in the conversation with the chat bot 100. In some aspects, the topic engagement system 142 utilizes a learning algorithm or model. As illustrated by FIG. 2B, the output of the topic engagement system 142 may be an engagement rate score 142 for each identified topic 128. The engagement rate of one topic ranges over all the users in a group chat. The topic engagement system 142 links each determined topic to any user engaged in (or provides input that relates to) that determined topic and scores the determined topic based on the number of engaged users or users linked to the topic, frequency of the topic (how many times the topic is discussed in the conversation), timing of the topic (or how recently the topic was discussed by one or more users), and/or the emotion label 115 of the topic. The higher the number of engaged users, the higher the frequency, the more recent the timing, and the more positive the emotion label 115 for the topic, the higher the topic engagement score is for the topic. The lower the number of engaged users, the lower the frequency, the less recent the timing, and the less positive the emotion label 115 for the topic, the lower the topic engagement score is for the topic. For example, the topic engagement system 142 may score an identified topic of Happy Hour from the conversation shown in FIG. 2B high because each user in the conversation (User1, User2, User3, and User4) is engaged in the conversation, because User1, User3, and User4 had a positive sentiment to the happy hour topic, and because the Happy Hour topic was discussed within the last five minutes.

In some aspects, the topic engagement system 142 utilizes an adapted time-delay model that expresses the engagement rate of one topic. Accordingly, one appearance of the topic (related sentence from some user) will contribute (improve) the engagement rate of the topic, yet this engagement rate attenuates or decreases as time passes or gets farther from the current time. For example, for one topic, if it is introduced 5 minutes before, and after that no one else responds or comments on this topic, then this topic's engagement rate continues to reduce as time passes. Alternatively in this example, if in the first minute, two users followed respond or comment on this topic, then the engagement rate is improved, yet this improvement rate tends to be weaker as time passes. Further, in this example, the more users that send comments relating to this topic that continue appear during 5 minutes, then the engagement rate of the topic continues increases. In some aspects, the topic engagement system 142 utilizes the following equations to compute the engagement rate for one topic:

$$1.\ k(t, t_o) = \begin{cases} \exp(-\lambda(t - t_o)) & \text{if } t \geq t_o \\ 0 & \text{if } t < t_o \end{cases}, \quad \text{EQ \#3}$$

where function k computes the importance of one appearance of one topic (as the importance will be reduced as time goes); where $\lambda$ is the delay constant; when $\lambda$ is 0, we have k(t, $t_o$)=1, which means that the topic was commented on within 5 minutes ago. At current time point t, and suppose the history H is H={$(w_1, t_1), \ldots, (w_n, t_n)$} where $w_1$ to $w_n$ are the topics (allow to be duplicated) of time point from $t_1$ to $t_n$. That is, at time point $t_1$, there is one sentence in the individual/group chat that includes topic $w_1, \ldots$, at time point $t_n$, there is one sentence in the individual/group chat that includes topic $w_n$.

$$2.\ C(w, t) = \sum_{i=1}^{n} \delta(w, w_i) k(t, t_i), \quad \text{EQ \#4}$$

Then, we compute the accumulated "engagement rate" of a topic w with equation #4 above. Here, δ(w,wi) is the delta function: if w=wi then δ(w,wi)=1; otherwise δ(w,wi)=0.

3. Thus, given a history dialog session, topic w's engagement rate at "current" time point t is:

$$\hat{P}(w_{n+1} = w \mid H, t_{n+1} = t) = \hat{P}(w \mid C(w, t)) = \frac{C(w, t) + \mu}{\sum_{w'} [C(w', t) + \mu]}. \quad \text{EQ \#5}$$

where, 0≤μ≤1 is Lidston smoothing parameter; when μ is 0, this equation is similar to Maximum Likelihood Estimation (MLE).

The user-topic model 144 determines each user's interest in any identified topic. The user-topic model 144 may determines each user's interest based on introduction or following of a topic, engagement frequency in a topic, and/or sentiment analysis of the user to the topic. In some aspects, the user-topic model 144 utilizes a learning algorithm or model. As illustrated by FIG. 2B, the output of the user-topic model 144 may be the score 145 of each user's 102 interest in each identified topic 128. As such, the user-topic model 144 links each user to each identified topic and then may scores each user's interest in the topic utilizing engagement frequency in the topic and each user's sentiment for that topic. For example, the user-topic model 144 determines that User1's 129A interest in topic1 128A is represented by score 145A. Each topic has only one "introducer" who mentions the topic the first time in the group chat. Also, each topic has no less than one "follower" who expresses positive/negative/neutral opinions (also referred to herein as sentiment) to this topic. For "introducer", the user-topic detection system 112 may score the introducer as alpha and score the "follower" as beta with a sentiment analysis weight of w. For example, in some aspects, the following equation may be utilized by the user-topic model 144:

f(user, topic)=alpha if user is the "introducer"; and
=w*beta if user is the "follower".  EQ#6

In some aspects, the user-topic model 144 scores the alpha as 2, the beta as 1 and the w as 1 when the sentiment analysis model returns a positive label, the w as 0.1 when the sentiment analysis model returns a negative label, and the w as 0.5 when the sentiment model 114 returns a neutral label.

For example, based on the conversation shown in FIG. 3A, if topic 1 128A is "happy hour", User1 129A may have a high interest score in Topic 1 128A of happy hour because User 1 introduced the topic, repeatedly engaged in the topic, and expressed a positive sentiment relating to the topic. However, in this same example, based on the conversation shown in FIG. 3A, the user-topic model 144 may determine that User2 has a lower interest score in topic 1 128A of "happy hour" since User 2 is a follower that only discussed the happy hour topic once and expressed a negative sentiment with regards to the happy hour topic ("Bad for work attendance").

The topic jumping system 146 determines a relationship between each determined topic. As discussed above, the topic jumping system 146 collects the topics, input sentences, labeled input sentences, and/or the labeled topics. The topic jumping system 146 construct a knowledge graph 135 of topic keywords and the relationship between every different topic based on the inputs or labeled inputs in the conversation (or the collection, the topic keyword or labeled topic keyword, and/or world knowledge 118. The world knowledge 118 as utilized herein refers to any information, attributes, relationships, and/or already formed relationship knowledge graphs that are accessible to the topic jumping system 146 via a network 113. The topic jumping system 146 may utilized the world knowledge to enrich, to assign attributes, and/or find relationships between different topics or topic keywords. Further, the topic jumping model 146 may utilize random walk to help track jumping from one existing topic to some new topic (which is not included in the dialog session yet). The topic jumping system 146 supplies users' requirements of "freshness" or relevancy for any given topic. For example, given the following sentence, "今日/today の/'s 飲み会/drinking party は 大井町/Ooimachi の/'s 俺の焼き鳥/My Yakitori という/named 店/restaurant で 開催する/takes place at," the syntactic dependency tree determined by the topic jumping system 146 is as follows:

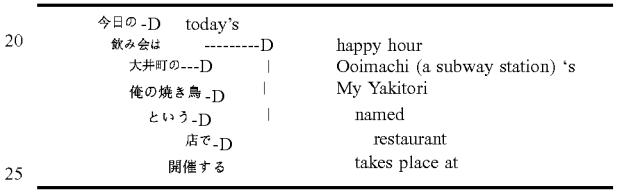

Figure 10:
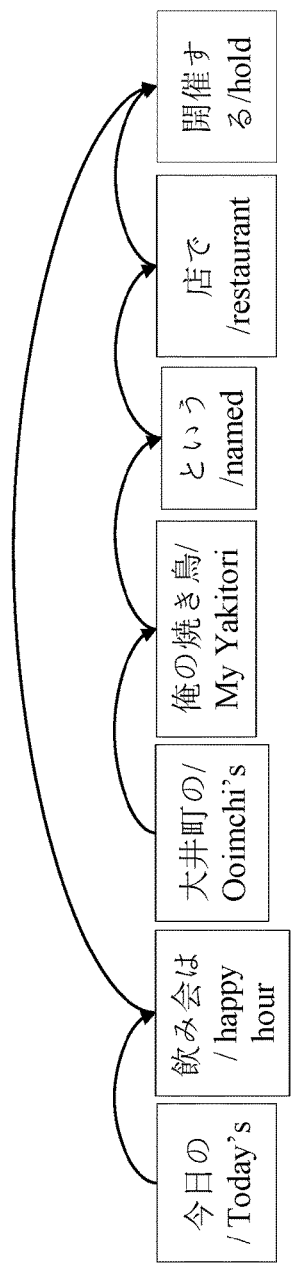
FIG. 10 is a schematic diagram illustrating an example of the syntactic dependency tree created by a topic jumping system for an example sentence of "Today's happy hour is at the restaurant named My Yakitori in Ooimachi", in accordance with aspects of the disclosure.

FIG. 10 illustrates an example of a graph of the dependency tree listed above for the example sentence, "今日/today の/'s 飲み会/happy hour は 大井町/Ooimachi の/'s 俺の焼き鳥/My Yakitori という/named 店/restaurant で 開催する/takes place at."

Figure 11:
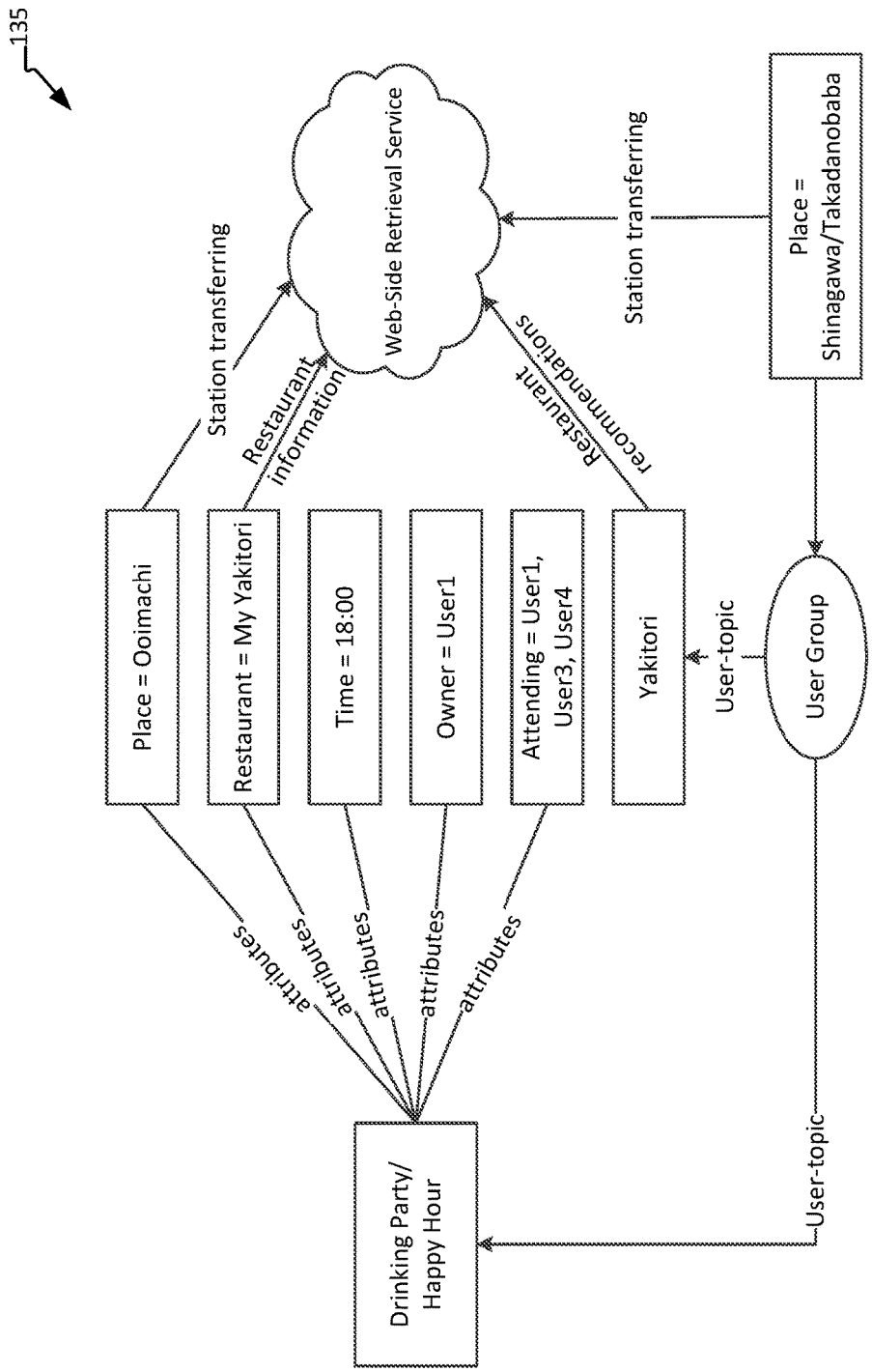
FIG. 11 is a schematic diagram illustrating an example of a topic knowledge graph created by the topic jumping system based on the conversation shown in FIG. 3A, in accordance with aspects of the disclosure.

This dependency tree informs the topic jumping system 146 that the place and restaurant are two attributes for the topic word of "happy hour". Furthermore, topic jumping system 146 may determine that these attributes are further topics. Thus, through this dependency tree, the topic jumping system 146 extracts or constructs a knowledge graph 135 as illustrated in FIG. 11. FIG. 11 illustrates an example knowledge graph 135 created by the topic jumping system 146 for the conversation between multiple user and the chat bot 100 shown in FIG. 3A. The transfer probability between any two topics in the knowledge graph 135 is determined or calculated by the topic jumping system 146 based on how many sentences that include both two topics and their dependency directions. The more sentences that support two different topics connections, the higher probability that users will or can jump between the two different topics following the dependency direction. In some aspects, the topic jumping system 146 may utilizes these probabilities or scores to determine the weight for a random walk from one topic to some novel topic in the group chat (which is supported by the pre-constructed knowledge graph 135).

The response prediction system 116 collects the determined topics 128, associated emotion labels 115, scored features 133, labeled user input sentences associated with one or more topics, and/or the created topic knowledge graph 135. In some aspects, the user input 130 includes a query 127. In some aspects, the response prediction system 116 collects input 130 from the client computing devices. In other aspects, response prediction system 116 collects the labeled user input sentences, topics 128, topic associated emotion labels 115, user labels 129, and scored features 133 and/or the topic knowledge graph 135 from the sentiment system 114, the topic detection system 112, the analysis systems 126, and/or the topic jumping system 146.

The response prediction system 116 determines if one or more responses 132 should be predicted based on the feature scores 133. The response prediction system 116 compares each topic and the topics associated features scores 133 to a relevancy threshold. In some aspects, the response prediction system 116 utilizes the features scores to determine or calculate a relevancy score for a given topic. If the feature scores 133 or relevancy score for a given topic meet the relevancy threshold, the response prediction system 116 determines that response should be provided to conversation. In response to the determination to provide a response, the response prediction system 116 predicts a response based on the labeled inputs associated with the topic, such as a query, the labeled topic, the topic knowledge graph 135, scored features 133, and/or world knowledge 118. If the feature scores 133 or relevancy do not meet the relevancy threshold, the response prediction system 116 determines that a response should not be predicted for the conversation by the chat bot 100. In some aspects, the relevancy threshold includes a minimum combined or average feature score 133 between the three different analysis models 126. In some aspects, the response prediction system 116 automatically determines that a topic meets a relevancy threshold, when the topic is associated with a user input that is a query 127. As such, the chat bot 100 may provide a response to the conversation with the one or more users in response to a user query 127 and/or spontaneously during the conversation when no response was requested by any of the users in the conversation.

In some aspects, the response prediction system 116 ranks each determined topic based on each topic's scored features, any associated query, and/or a topic's emotion label. In these aspects, the ranking of the topics is comparted to the relevant threshold. If the topic's ranking meets the relevancy threshold, then a response is predicted by the response prediction system 116. In these aspects, if the topic's ranking does not meet the relevancy threshold, then a response is not predicted by the response prediction system 116.

As discussed above, the response prediction system 116 predicts one or more responses 132 in response to a topic meeting the relevancy threshold. The response 132 may be a comment, a summary, a question, and/or any other suitable output for conversing with one or more users 102. The response may be predicted by the response prediction system 116 based on a query if present, relevant topic, the emotion label associated with the relevant topic, labeled input sentences associated with the relevant topic, scored features, and/or the topic knowledge graph 135.

In some aspects, the response prediction system 116 utilizes a response ranking model to predict the response. In some aspects, the ranking model is a learning-to-rank (LTR) architecture of pairwise learning for constructing the relevance-based response ranking model (for specific topic and/or specific user(s)). The ranking model may rank available response texts to some specific user(s) under a specific query and/or some specific topic. The response prediction system 116 trains a gradient boosting decision tree (GBDT) for the ranking task. The ranking model utilizes the scored features 133 and the topic knowledge graph 135 along the following items, to predict a response:

Word ngrams: unigrams and bigrams for words in the text input;
Character ngrams: for each word in the text, character ngrams are extracted, for example, 4-grams and 5-grams may be utilized;
Word skip-grams: for all the trigrams and 4-grams in the text, one of the words is replaced by * to indicate the presence of non-contiguous words;
Brown cluster ngrams: brown clusters are utilized to represent words (in text), and extract unigrams and bigrams as features;
Part-of-speech (POS) tags: the presence or absence of part-of-speech tags are used as binary features;
Lexicons: the English wordnet Sentiment Lexicon may be utilized;
Social network related words: number (in text) of hashtags, emoticons, elongated words, and punctuations are may also be utilized; and
Word2vec cluster ngrams: Word2vec tool may be utilized to learn 100-dimensional word embedding from a social network dataset, next a K-means algorithm and L2 distance of word vectors is employed to cluster the million-level vocabulary into 200 classes that represent generalized words in the text.

As discussed above, the core worker 111 may collect the one or more responses from the response prediction system 116 and reconfigure the response if necessary before providing the response to the conversation.

In some aspects, the response prediction system 116 may select a response that summarizes the topic that meets the relevancy threshold. For example, FIG. 3B illustrates a chat bot summary of the conversation shown in FIG. 3A in a conversation between User5 and the chat bot 100 (or Rinna). In further aspects, the response prediction system 116 may perform a requested action and/or provide a requested response from a user query, such as the retrieval of information or the making of a dinner reservation. In other aspects, the response selected by the response prediction system 116 may be directed to an entirely new topic that was not previously discussed. For example, as illustrated in FIG. 3A Rinna (or chat bot 100) provides the response "Rinna also wants to join! Should I like the happy hour?" In this example, the chat bot 100 did not receive a user query, but responded spontaneously to the conversation since the topic of happy hour met a relevancy threshold. Similarly, as illustrated in FIG. 3A, Rinna (or chat bot 100) provides the response, "[smiley face], here are the directions from Shinagawa to Ooimachi.", even though, none of the user requested or asked for directions from Shinagawa to Ooimachi. Further, Rinna spontaneously introduced a new topic of "liking" on social media the proposed happy hour topic as illustrated in FIG. 3A, and spontaneously introduced a new topic of favorite fried chicken restaurants as illustrated in FIG. 3B, even though, social media comments and fried chicken restaurants were not previously discussed by any of the users in the conversations. Also, as illustrated in FIG. 3A, Rinna (or chat bot 100) provides the response "show map of the restaurant; cost estimate: $40/person; at 18:00" in response to a user query of "Rinna did you record?" Additionally, as illustrated in FIG. 3A Rinna (or chat bot 100) provides the response "Drinking party! Currently we have two attendees" in response to a user question to the entire group of the conversation and not necessarily directed to the chat bot 100.

The chat bot 100 also includes a feedback system 119. The feedback system 119 utilizes user feedback and/or world feedback 122 to train or update one or more learning algorithms and/or models utilized by the topic detection system 112, the sentiment system 114, and/or the response prediction system 116. In some aspects, the feedback system 119 utilizes user feedback and/or world feedback 122 to train or updated the one or more learning algorithms and/or leaning models utilized by the user relationship system 140, the topic engagement system 142, the user-topic system 144, and/or the topic jumping system 146.

In some aspects, the feedback system 119 collects world feedback 122 via a network 113. The world feedback 122 may include queries and corresponding responses from other users of the chat bot 100 that can be utilized as positive or negative training data.

In other aspects, the feedback system 119 collects user answers from one or more users 102 in reply to a previously provided response by the chat bot 100 in a conversation. The feedback system 119 analyzes the answer to determine user feedback for the response. The feedback system 119 utilizes the determined user feedback as positive or negative training data. In some aspects, the user feedback determined by the feedback system 119 for the result response is based at least on the emotion label of the answer.

Figure 4:
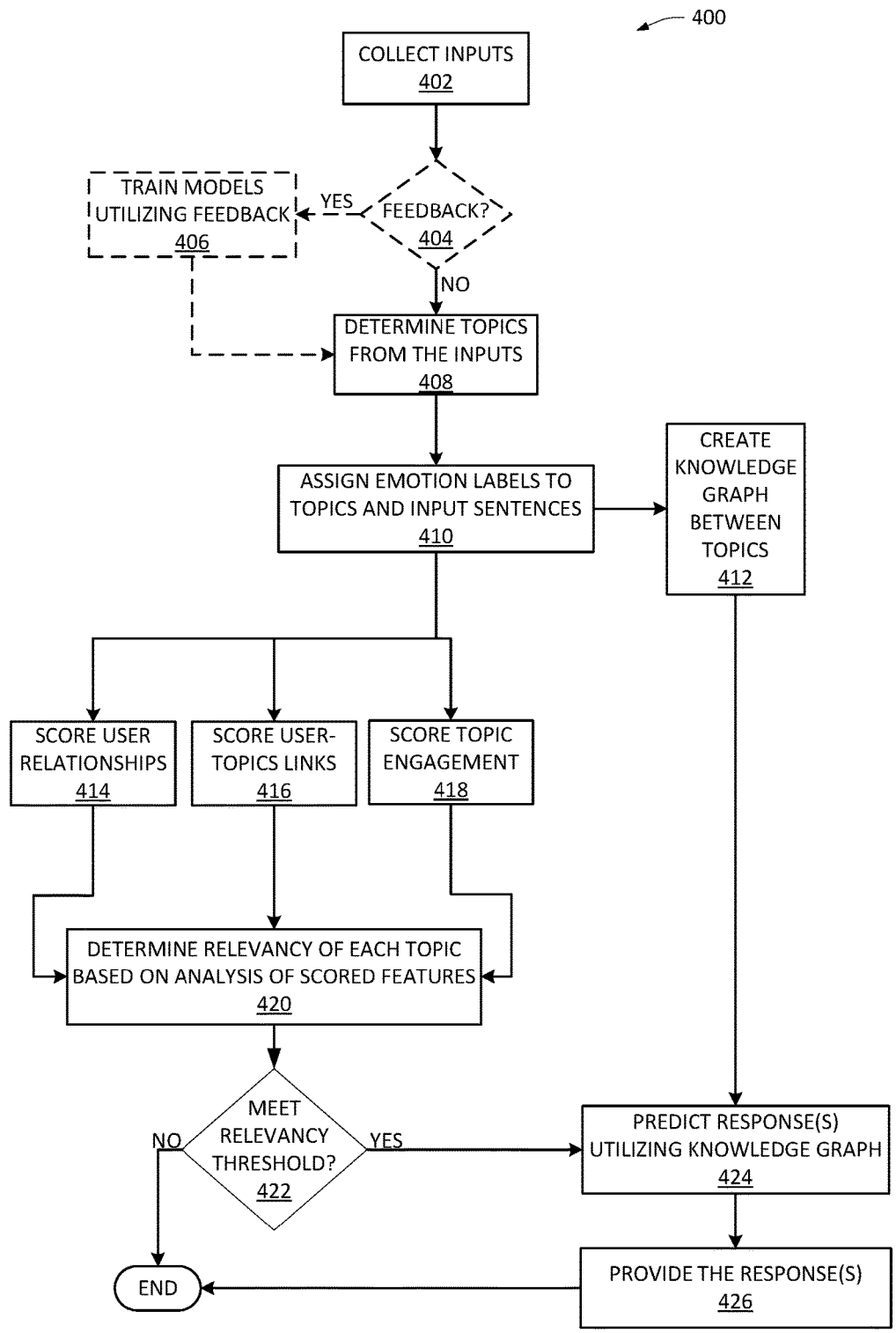
FIG. 4 is a block flow diagram illustrating a method for multiple topic intelligent automated chatting, in accordance with aspects of the disclosure.

FIG. 4 illustrates a flow diagram conceptually illustrating an example of a method 400 for multiple topic intelligent automated chatting. In some aspects, method 400 is performed by an application, such as the chat bot 100 described above. Method 400 provides multiple topic intelligent automated chatting by analyzing the inputs in a conversation to determine topics in the conversation, to assign emotion labels to topics and inputs in the conversation, create a knowledge graph of the topics, and to assign feature scores. Method 400 determines and scores the relationship between each set of two different user, determines and scores topic engagement, and determines and scores user-topic interest. Based on these feature scores, method 400 determines whether or not to provide a spontaneous or a requested response to the conversation. If a response is provided, method 400 predicts one or more responses utilizing knowledge graph created by method 400, labeled input sentences associated with a topic, scored features, world knowledge, and/or a labeled topic. As such, method 400 performs multiple topic automated chatting that is more effective, more engaging, easier to use, and more lifelike than previously utilized automated chat methods that were not able to track and respond to different topics in a multiple topic conversation between one or more uses.

Method 400 starts at operation 402. At operation 402, one or more user inputs are collected to form a collection. In some aspects, any user inputs in the conversation are collected. In other aspects, only user inputs for a session of a conversation are collected to form a collection at operation 402. The user inputs may be provided in one or more different modalities, such as video, voice, images, and/or texts. In some aspects, at operation 402 an input is processed or converted into text. In some aspects, a LU system with one or more different APIs is utilized to convert the received user inputs into text and/or annotated text. In some aspects, the user input includes a user query.

In some aspects, method 400 includes operations 404 and 406. At operation 404, a determination is made whether or not any world feedback and/or user feedback has been collected. At operation 404, user feedback may be collected from user inputs and world feedback may be collected via a network. If no feedback has been collected at operation 404, then operation 408 is performed. If feedback has been collected at operation 404, then operation 406 is performed. At operation 406, the feedback is sent to one or more learning models or algorithms utilized by method 400 to update or train those models or algorithms based on the feedback.

At operation 408, the user inputs are analyzed to determine one or more topics in the conversation. The conversation is between one or more users and the automated chatting method 400. In some aspects, a syntactic dependency parser is utilized to parse sentences in the conversation and pick noun words/phrases that are topic candidates at operation 408.

After the performance of operation 408, operation 410 is performed. At operation 410, an emotion label is assigned to every sentence in the one or more input sentences. At operation 410 each sentence in the input collection is semantically evaluated or analyzed. In some aspects, voice data and/or text data from each user's input sentences are evaluated to determine the emotion of the user during the input sentence. In further aspects, each sentence is analyzed utilizing a multiple class vector support machine at operation 410. Next, at operation 410, an emotion label for each sentence is identified and assigned to form labeled sentences. Each input sentence is associated with one or more topic based on operation 408. As such each labeled sentence is associated with one or more topics. In some aspects, the emotion label is positive or negative. In other aspects, the emotion label is positive, negative, or neutral. In further aspects, a user's text input is evaluated utilizing a multiple class vector support machine trained utilizing word ngrams, character ngrams, word skip-grams, brown cluster ngrams, part-of-speech tags, lexicons, social network related words, and/or word2vec cluster ngrams to identify the emotion label for each sentence at operation 410.

Further, at operation 410 a sentiment or an emotion label is assigned to each topic. At operation 410, the labeled input sentences for each topic are collected and analyzed. Based on the emotion labels for the input sentences associated with each topic, each topic may be assigned an emotion label or sentiment at operation 410. For example, the emotion labels for each input sentence associated with each topic may be averaged to determine the appropriate emotion label or sentiment for each topic.

At operation 412, a knowledge graph between topics identified at operation 412 is created that graphs relationships between the identified topics and/or labeled topic. In some aspects, the knowledge graph of the topics is created based on the inputs and/or labeled inputs in the conversation (or the collection) and/or world knowledge 118 at operation 412. In further aspects at operation 412, a dependency tree may be created from the one or more inputs that is enriched utilizing world knowledge. As such, the dependency tree assigns attributes to the one or more topics. In these aspects, the knowledge graph may be extracted and/or constructed from the dependency tree at operation 412.

After the performance of operation 410, operation 414, 416, and/or 418 are performed. At operation 414 a closeness of the relationship each set of two different user is scored. However, if the there is only one user in the conversation, operation 410 may be skipped or not performed. First, at operation 410, a relationship between each set of two different users is identified. The closeness of each determined relationship may be determined at operation 410 based on social connection, agreement, and sentiment analysis to form a scored first feature or a scored relationship closeness.

At operation 416 a user's interest in each topic is sored to form a scored second feature or a scored user-topic interest. The user's interest in each topic is determined or scored based on the user's sentiment toward each topic and engagement frequency in each topic at operation 416. In further aspects, the user interest in each topic is further determined or scored based on whether the user introduced the topic or commented on the topic after introduction by another user.

At operation 418 an engagement rate for each topic is scored to form a scored third feature or scored topic engagement rate. In some aspects, the score for the engagement rate for a topic is determined based on the number of users engaged in a topic, frequency of the topic in the conversation, timing of the topic, and the sentiment of the users toward the topic who engaged in the topic;

In some aspects, method 400 includes operation 420. At operation 420, the scored features are collected and evaluated to determine a relevancy score of each topic. The higher the relevancy score of a topic, the more relevant the topic is to the conversation. In some aspects, each of the different feature scores utilizes the same scale to provide an easier comparison between the different features. In other aspects, each feature may be weighed. In these aspect, the score of the feature with higher weights will be given more consideration in the relevancy score calculation than the lower weighted features. In some aspects at operation 420, each relationship for a set of two different users is linked with any topic the set of two different users discussed between each other. In some aspects at operation 420, the closeness score of the relationships, any user interest scores for that topic, and the engagement rate of the topic are utilized to calculate the relevancy score for a given topic. In some aspects, the feature scores are averaged or totaled to determine a relevancy score for a given topic at operation 420. In other aspects, the relevancy scores of each topic is utilized to rank each identified topic. Topics with higher relevancy scores are ranked above topics with lower relevancy scores. In further aspects, topics with an associated user query may have an increased relevancy score.

Method 400 includes operation 422. At operation 422 a determination of whether any topic meets a relevancy threshold is made. At operation 422, if operation 420 is performed, a relevancy score for each feature is compared to the relevancy threshold. At operation 422, if method 400 does not include operation 420, the feature scores associated with each topic may each be compared to the relevancy threshold individually or in combination. If operation 422 determines that the relevancy threshold has been met, then operation 424 is performed. If operation 422 determines that the relevancy threshold has not been met, then method 400 may end until new input is collected at operation 402 to restart the performance of method 400.

At operation 424, one or more responses are predicted or determined based on the labeled input sentence for the relevant topic, the knowledge graph, and/or the labeled relevant topic. In some aspects, method 424 is performed by the response prediction system 116 as disclosed above. In further aspects, method 424 is performed utilizing a LTR architecture of pairwise learning for constructing a relevance-based response ranking model (for specific topic and/or specific user(s)). In some aspects, the response is directed to a new topic. In other aspects, the response replies to a user query. In further aspects, the response may be a summary of a topic in the conversation. In yet other aspects, the response may be or include an action performance, such as the booking of a reservation and the retrieval of information.

In response to the one or more responses being predicted at operation 424, operation 426 is performed. At operation 426 the one or more response are provided to the conversation. In some aspects, the one or more responses are provided by a client computing device and/or an application to the conversation at operation 426. In other aspects, instructions are sent to the client computing device to provide the one or more responses to the conversation at operation 426. The client computing device provides the one or more responses utilizing any known electronic communication modality and may be in the form of a visual, audio, tactile, and/or other sensory mechanisms at operation 426. For example, the client computing device may provide the one or more responses to an application hosting the conversation. After operation 426, method 400 ends until method 400 collects new input at operation 402 to restart the performance of method 400.

FIGS. 5-8 and the associated descriptions provide a discussion of a variety of operating environments in which aspects of the disclosure may be practiced. However, the devices and systems illustrated and discussed with respect to FIGS. 5-8 are for purposes of example and illustration and are not limiting of a vast number of computing device configurations that may be utilized for practicing aspects of the disclosure, described herein.

Figure 5:
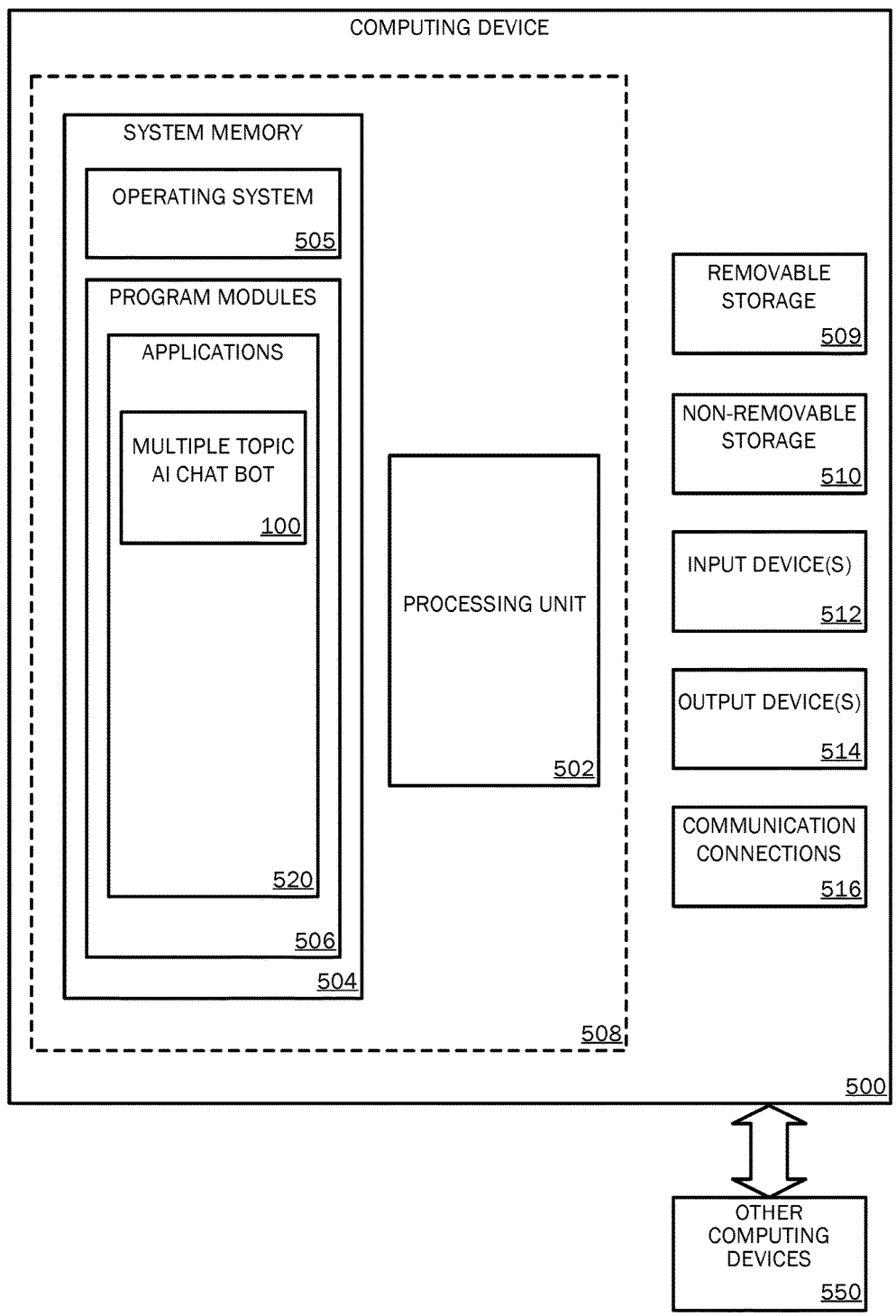
FIG. 5 is a block diagram illustrating example physical components of a computing device with which various aspects of the disclosure may be practiced.

FIG. 5 is a block diagram illustrating physical components (e.g., hardware) of a computing device 500 with which aspects of the disclosure may be practiced. For example, the multiple topic AI chat bot 100 could be implemented by the computing device 500. In some aspects, the computing device 500 is a mobile telephone, a smart phone, a tablet, a phablet, a smart watch, a wearable computer, a personal computer, a desktop computer, a gaming system, a laptop computer, and/or etc. The computing device components described below may include computer executable instructions for the chat bot 100 that can be executed to employ method 400. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combined of such memories. The system memory 504 may include an operating system 505 and one or more program modules 506 suitable for running software applications 520. The operating system 505, for example, may be suitable for controlling the operation of the computing device 500. Furthermore, aspects of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., LU system 110, topic detection system 112, sentiment system 114, core worker 111, feedback system 119, and/or the response prediction system 116) may perform processes including, but not limited to, performing method 400 as described herein. For example, the processing unit 502 may implement the chat bot 100, including the LU system 110, topic detection system 112, sentiment system 114, response prediction system 116, core worker 111, and/or the feedback system 119. Other program modules that may be used in accordance with aspects of the present disclosure, and in particular to generate screen content, may include a digital assistant application, a voice recognition application, an email application, a social networking application, a collaboration application, an enterprise management application, a messaging application, a word processing application, a spreadsheet application, a database application, a presentation application, a contacts application, a gaming application, an e-commerce application, an e-business application, a transactional application, exchange application, a device control application, a web interface application, a calendaring application, etc. In some aspect, the chat bot 100 allows a user to interact with in one or more of the above referenced applications in more effective, more efficient, and improved manner.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip).

Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 500 may also have one or more input device(s) 512 such as a keyboard, a mouse, a pen, a microphone or other sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, RF transmitter, receiver, and/or transceiver circuitry, universal serial bus (USB), parallel, and/or serial ports.

The term computer readable media or storage media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
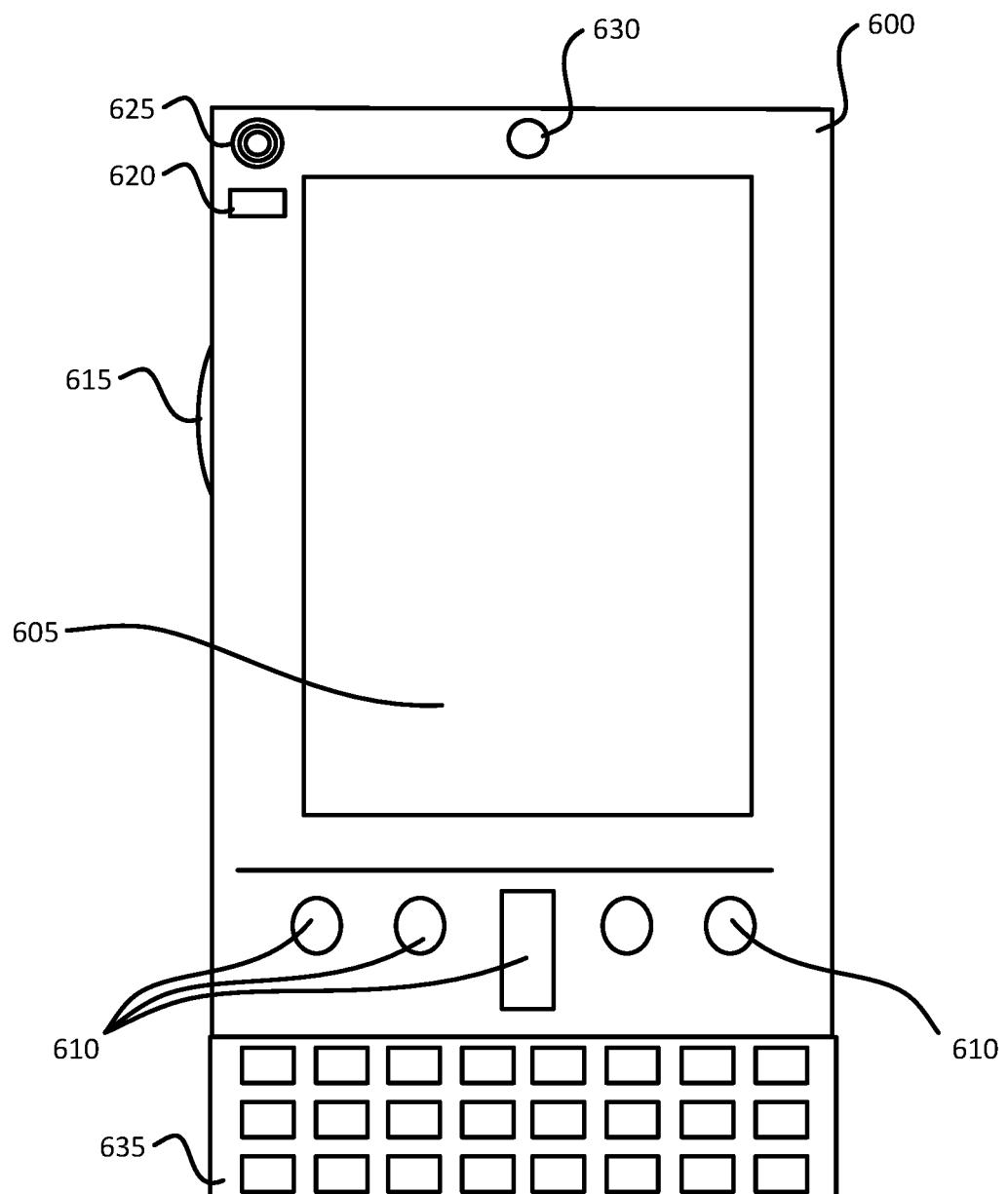
FIG. 6A is a simplified block diagram of a mobile computing device with which various aspects of the disclosure may be practiced.
Figure 6B:
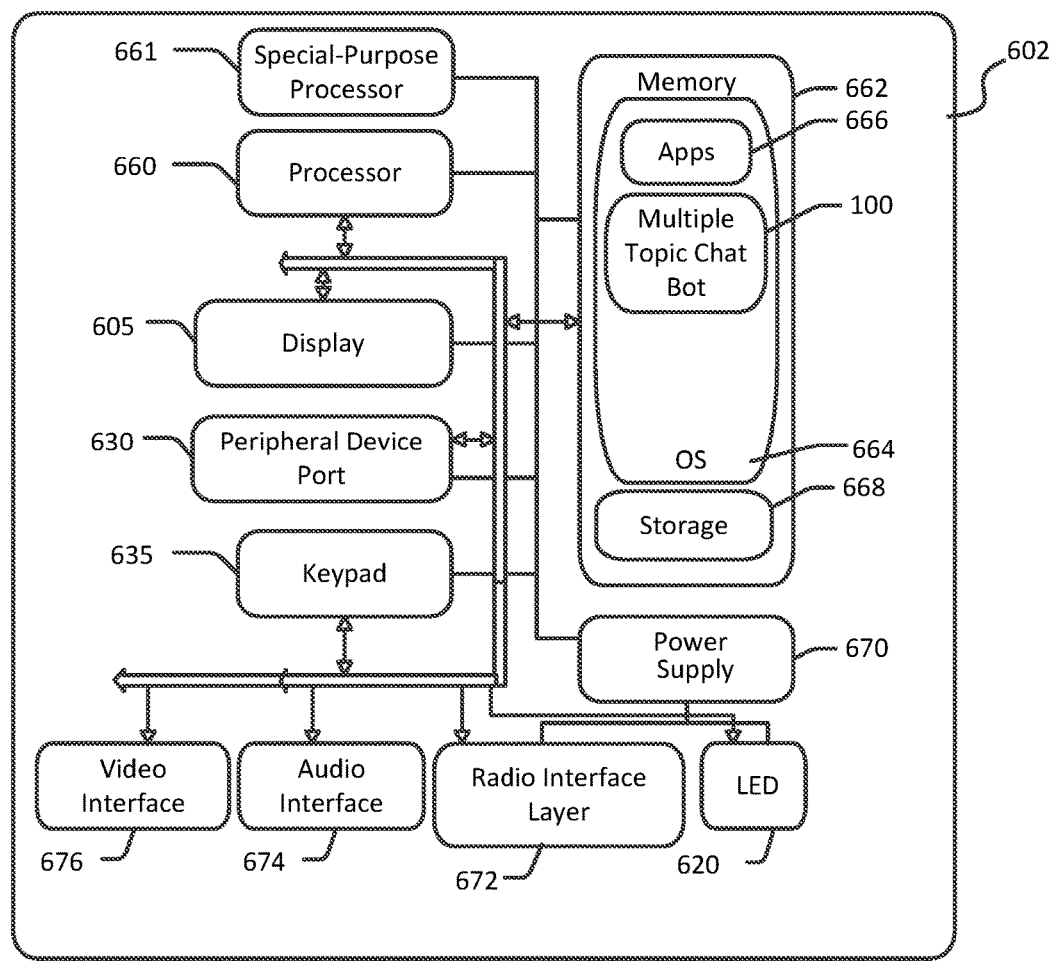
FIG. 6B is a simplified block diagram of the mobile computing device shown in FIG. 6A with which various aspects of the disclosure may be practiced.

FIGS. 6A and 6B illustrate a mobile computing device 600, for example, a mobile telephone, a smart phone, a tablet, a phablet, a smart watch, a wearable computer, a personal computer, a desktop computer, a gaming system, a laptop computer, or the like, with which aspects of the disclosure may be practiced. With reference to FIG. 6A, one aspect of a mobile computing device 600 suitable for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display).

If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some aspects. In yet another alternative aspect, the mobile computing device 600 is a portable phone system, such as a cellular phone. The mobile computing device 600 may also include an optional keypad 635. Optional keypad 635 may be a physical keypad or a "soft" keypad generated on the touch screen display.

In addition to, or in place of a touch screen input device associated with the display 605 and/or the keypad 635, a Natural User Interface (NUI) may be incorporated in the mobile computing device 600. As used herein, a NUI includes as any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence.

In various aspects, the output elements include the display 605 for showing a graphical user interface (GUI). In aspects disclosed herein, the various user information collections could be displayed on the display 605. Further output elements may include a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile computing device. That is, the mobile computing device 600 can incorporate a system (e.g., an architecture) 602 to implement some aspects. In one aspect, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666 and/or the chat bot 100 run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

The system 602 has a power supply 670, which may be implemented as one or more batteries. The power supply 670 might further include an external power source, such as an AC adapter or a powered docking cradle that supplements or recharges the batteries.

The system 602 may also include a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated aspect, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

Figure 7:
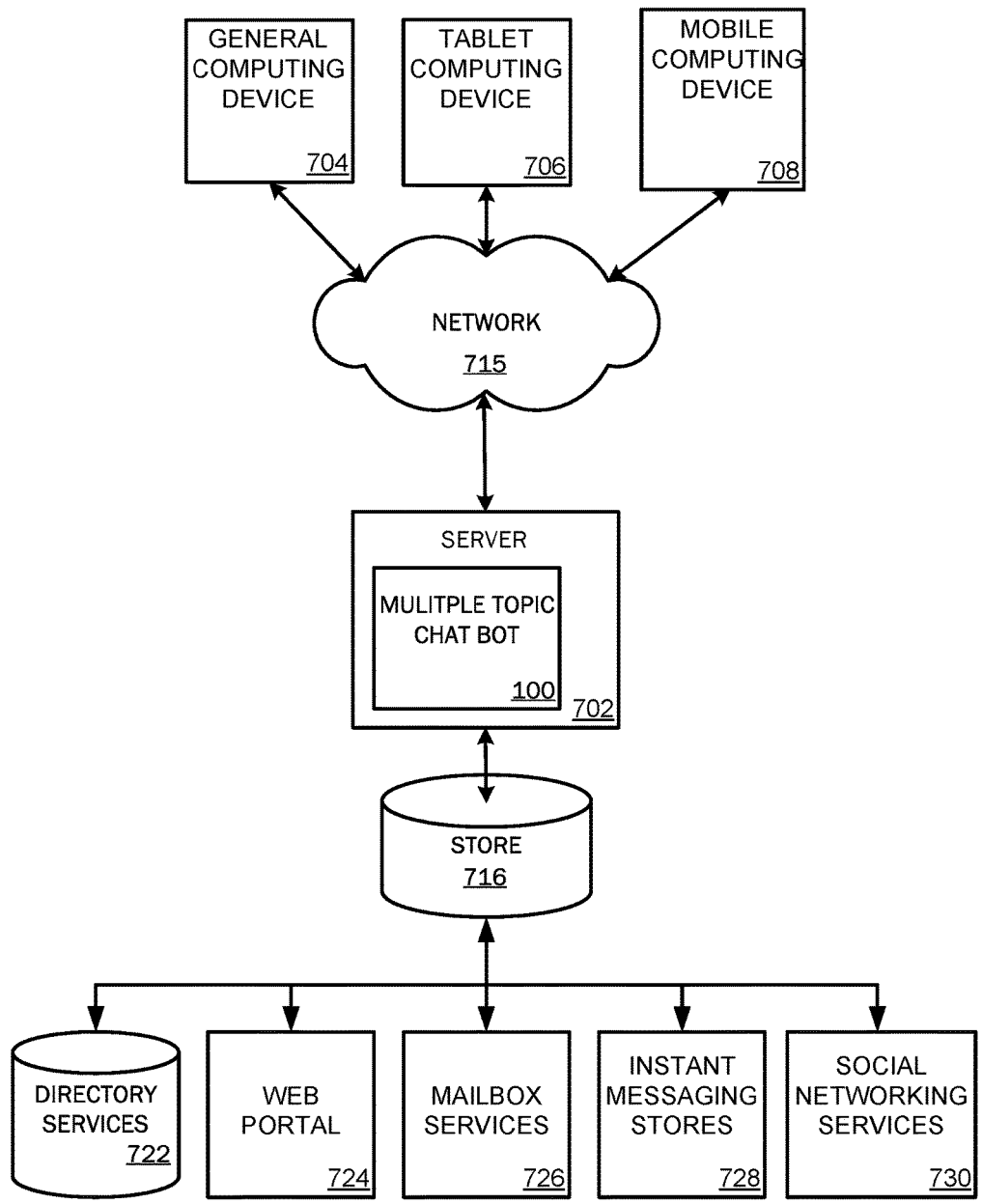
FIG. 7 is a simplified block diagram of a distributed computing system in which various aspects of the disclosure may be practiced.

FIG. 7 illustrates one aspect of the architecture of a system for processing data received at a computing system from a remote source, such as a general computing device 704, tablet 706, or mobile device 708, as described above. Content displayed and/or utilized at server device 702 may be stored in different communication channels or other storage types. For example, various documents may be stored using a directory service 722, a web portal 724, a mailbox service 726, an instant messaging store 728, and/or a social networking site 730. By way of example, the chat bot may be implemented in a general computing device 704, a tablet computing device 706 and/or a mobile computing device 708 (e.g., a smart phone). In some aspects, the server 702 is configured to implement a chat bot 100, via the network 715 as illustrated in FIG. 7.

Figure 8:
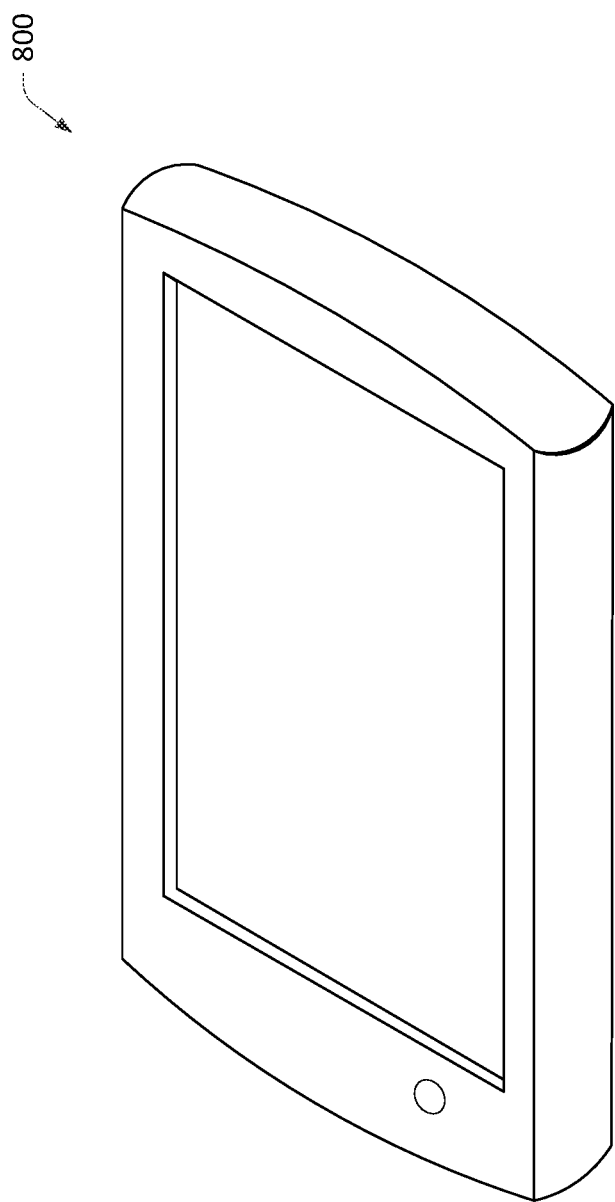
FIG. 8 illustrates a tablet computing device with which various aspects of the disclosure may be practiced.

FIG. 8 illustrates an exemplary tablet computing device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Embodiments of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

This disclosure described some embodiments of the present technology with reference to the accompanying drawings, in which only some of the possible aspects were described. Other aspects can, however, be embodied in many different forms and the specific embodiments disclosed herein should not be construed as limited to the various aspects of the disclosure set forth herein. Rather, these exemplary aspects were provided so that this disclosure was thorough and complete and fully conveyed the scope of the other possible aspects to those skilled in the art. For example, aspects of the various embodiments disclosed herein may be modified and/or combined without departing from the scope of this disclosure.

Although specific aspects were described herein, the scope of the technology is not limited to those specific aspects. One skilled in the art will recognize other aspects or improvements that are within the scope and spirit of the present technology. Therefore, the specific structure, acts, or media are disclosed only as illustrative aspects. The scope of the technology is defined by the following claims and any equivalents therein.

The invention claimed is:

1. A system for a multiple topic chat bot, the system comprising:
    at least one processor; and
    a memory for storing and encoding computer executable instructions that, when executed by the at least one processor is operative to:
        collect user inputs in a conversation to form a collection;
        analyze the collection to determine topics in the conversation;
        assign an emotion label to each topic;
        identify a relationship between different users;
        score a closeness of the relationship based on social connection, agreement, and sentiment analysis to form a scored first feature;
        score each user's interest in each topic based on user sentiment toward each topic and engagement frequency in each topic to form a scored second feature;
        score an engagement rate for each topic of the topics based on a number of users engaged in a topic, frequency of the topic in the conversation, timing of the topic, and the user sentiment toward the topic to form a scored third feature;
        create a knowledge graph of the topics that graphs relationships between the topics utilizing topic keywords based on the collection and world knowledge;
        determine that a first topic meets a relevancy threshold based on scored features for the first topic, wherein the scored features include the scored first feature, the scored second feature, and the scored third feature for the first topic;
        predict, utilizing a trained model, one or more first responses based on the knowledge graph and the user inputs associated with the first topic;
        provide the one or more first responses to the conversation;
        predict one or more second responses utilizing the knowledge graph and the user inputs associated with a second topic; and
        provide the one or more second responses to the conversation.

2. The system of claim 1, wherein the user inputs do not include a query.

3. The system of claim 1, wherein the at least one processor is operative to:
    identify that a query included in the user inputs is associated with the first topic, wherein the first topic meets the relevancy threshold because the first topic includes the query, and
    wherein the one or more first responses is a reply to the query.

4. The system of claim 1, wherein the scored first feature, the scored second feature, and the scored third feature each utilize a same scoring scale.

5. The system of claim 1, wherein the at least one processor is operative to: score the closeness of the relationship between different users utilizing a first learning algorithm;
    score each user's interest in each topic utilizing a second learning algorithm; and
    score the engagement rate for each topic utilizing a third learning algorithm.

6. The system of claim 5, wherein the at least one processor is operative to:
    collect at least one of user feedback and world feedback; and
    train at least one of the first learning algorithm, the second learning algorithm, and the third learning algorithm based on the at least one of the user feedback and the world feedback.

7. The system of claim 1, wherein the user inputs are from at least a first user and second user.

8. The system of claim 1, wherein the at least one processor is operative to:
    compare each topic of the topics to a timing threshold, wherein the topics include the first topic, a second topic, and a third topic;
    determine that the third topic breaches the timing threshold; and
    delete the third topic in response to determining that the third topic breaches the timing threshold.

9. The system of claim 1, wherein utilizing the trained model comprises:
    utilizing a learning-to-rank architecture of pairwise learning for constructing a relevance-based response ranking model.

10. The system of claim 9, wherein the at least one processor is operative to utilize a gradient boosting decision tree for the relevance-based response ranking model to predict the one or more first responses utilizing the knowledge graph for the first topic.

11. The system of claim 1, wherein the one or more first responses is a summary of opinions for the first topic.

12. The system of claim 1, wherein the one or more first responses is a new topic.

13. The system of claim 1, wherein the at least one processor is operative to
    rank each topic in the topics based on the scored first feature, the scored second feature, and the scored third feature for each topic.

14. The system of claim 1, wherein the at least one processor is operative to
    determine that a second topic meets the relevancy threshold.

15. A method for emotionally intelligent automated chatting, the method comprising:

collecting inputs in a conversation to form a collection;
analyzing the collection to determine topics in the conversation;
assign a sentiment to each topic;
scoring an engagement rate for each topic to form an engagement score for each topic;
scoring a user interest in each topic to form an interest score for each topic;
creating a knowledge graph between the topics that graphs relationships between the topics;
determining a relationship between each set of users in the conversation;
scoring a closeness of the relationship to form a closeness score for each relationship;
determining that a first topic of the topics meets a relevancy threshold based on the engagement score, the interest score of the first topic, and the closeness score between each set of users engaged in the first topic;
predicting, utilizing a trained model, a first response based on the knowledge graph and inputs associated with the first topic;
providing the first response to the conversation;
predicting one or more second responses utilizing the knowledge graph and inputs associated with a second topic; and
providing the one or more second responses to the conversation.

16. The method of claim 15, further comprising
identifying that a query included in the inputs is associated with the first topic,
wherein the first topic meets the relevancy threshold because the first topic includes the query, and
wherein the first response is a reply to the query.

17. The method of claim 15, wherein the inputs do not include a query, and
wherein the engagement score and the interest score are averaged before comparison to the relevancy threshold.

18. The method of claim 15, further comprising:
comparing each topic of the topics to a timing threshold, wherein the topics includes the first topic, a second topic, and a third topic;
determining that that the third topic breaches the timing threshold; and
deleting the third topic in response to determining that the third topic breaches the timing threshold.

19. The method of claim 15, wherein the conversation includes at least two users.

20. A system for a multiple topic chat bot, the system comprising:
at least one processor; and
a memory for storing and encoding computer executable instructions that, when executed by the at least one processor is operative to:
collect user inputs from a group chat of a first user and a second user to form a collection;
analyze the collection to determine a first topic and a second topic;
assign a sentiment to each of the first topic and the second topic;
create a knowledge graph of the first topic and the second topic;
identify a first relationship between the first user and the second user;
score a closeness of the first relationship to form a scored first relationship;
score an interest of each of the first user and the second user in the first topic to form a scored first user-first topic interest and a scored second user-first topic interest;
score the interest of each of the first user and the second user in the second topic to form a scored first user-second topic interest and a scored second user-second topic interest;
score an engagement rate for each of the first topic and the second topic to form a scored first topic engagement rate and a scored second topic engagement rate;
determine a first relevancy score of the first topic based on a first evaluation of:
the scored first relationship if both the first user and the second user discussed the first topic with each other,
the scored first user-first topic interest,
the scored second user-first topic interest, and
the scored first topic engagement rate;
determine that the first topic does not meet a relevancy threshold based on the first relevancy score of the first topic;
determine a second relevancy score of the second topic based on a second evaluation of:
the scored first relationship if both the first user and the second user discussed the second topic with each other,
the scored first user-second topic interest,
the scored second user-second topic interest, and
the scored second topic engagement rate;
determine that the second topic meets the relevancy threshold based on the second relevancy score of the second topic;
predict a response utilizing a trained model based on the knowledge graph and the user inputs associated with the second topic; and
provide the response to the group chat.

* * * * *